(12) United States Patent
Matsumoto et al.

(10) Patent No.: US 12,222,252 B2
(45) Date of Patent: Feb. 11, 2025

(54) LOAD SENSOR

(71) Applicant: Panasonic Intellectual Property Management Co., Ltd., Osaka (JP)

(72) Inventors: Takashi Matsumoto, Osaka (JP); Hiroyuki Furuya, Osaka (JP); Yuta Moriura, Osaka (JP); Susumu Uragami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 438 days.

(21) Appl. No.: 17/728,245

(22) Filed: Apr. 25, 2022

(65) Prior Publication Data
US 2022/0244112 A1    Aug. 4, 2022

Related U.S. Application Data

(63) Continuation of application No. PCT/JP2020/040108, filed on Oct. 26, 2020.

(30) Foreign Application Priority Data

Oct. 29, 2019 (JP) .................................. 2019-196686

(51) Int. Cl.
*G01L 1/14* (2006.01)
*G01N 5/00* (2006.01)

(52) U.S. Cl.
CPC .............. *G01L 1/14* (2013.01); *G01L 1/146* (2013.01); *G01N 5/00* (2013.01)

(58) Field of Classification Search
CPC .............. G01L 1/14; G01L 1/146; G01N 5/00
See application file for complete search history.

(56) References Cited

U.S. PATENT DOCUMENTS

| 5,571,973 A | * | 11/1996 | Taylot ................. G01L 1/205 |
| | | | 73/DIG. 4 |
| 10,067,008 B2 | * | 9/2018 | Scheffer ................. G01L 1/142 |
| 2017/0300147 A1 | * | 10/2017 | Tomita ................. G06F 3/047 |
| 2017/0315165 A1 | | 11/2017 | Kawaguchi et al. |
| 2019/0277713 A1 | | 9/2019 | Moriura et al. |

FOREIGN PATENT DOCUMENTS

| JP | 5278038 B2 | 9/2013 |
| WO | 2017/022258 A1 | 2/2017 |
| WO | 2018/096901 A1 | 5/2018 |

OTHER PUBLICATIONS

WO2018096901 A1 Translation (Year: 2018).*
International Search Report issued in corresponding International Patent Application No. PCT/JP2020/040108, dated Nov. 17, 2020, with English translation.

* cited by examiner

*Primary Examiner* — Jonathan M Dunlap
(74) *Attorney, Agent, or Firm* — Rimon P.C.

(57) ABSTRACT

A load sensor includes: an element part in which capacitance changes in accordance with a load; a copper wire drawn from the element part in order to detect change in the capacitance; and a fixation tool configured to fix the copper wire to the element part. The element part includes an electrically-conductive elastic body that is electrically conductive and that forms one pole for the capacitance, and the fixation tool presses and fixes the copper wire to a surface of the electrically-conductive elastic body so as to be movable with respect to the surface of the electrically-conductive elastic body in accordance with elastic deformation of the electrically-conductive elastic body.

14 Claims, 18 Drawing Sheets

FIG. 6A  EXPERIMENT: EMBODIMENT 1
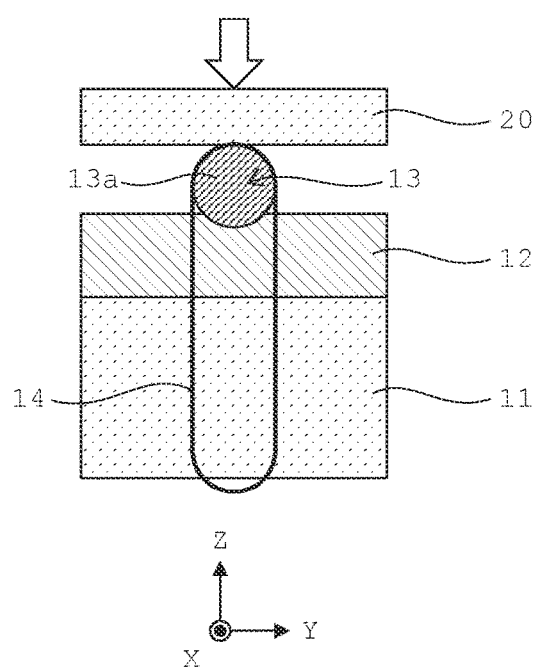
FIG. 6B  EXPERIMENT: COMPARATIVE EXAMPLE
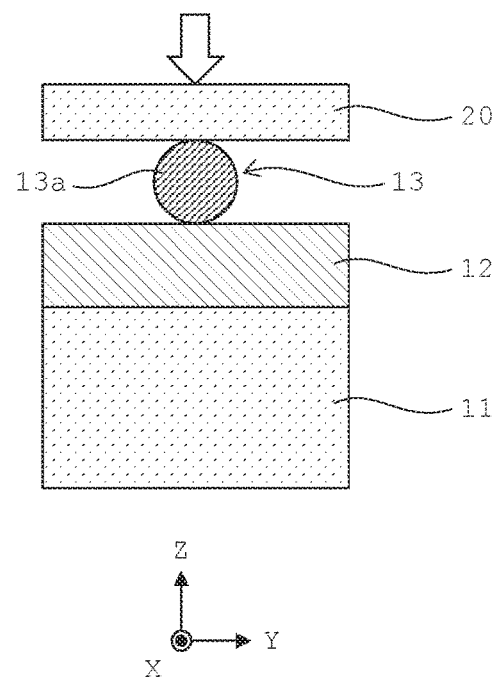
FIG. 6C
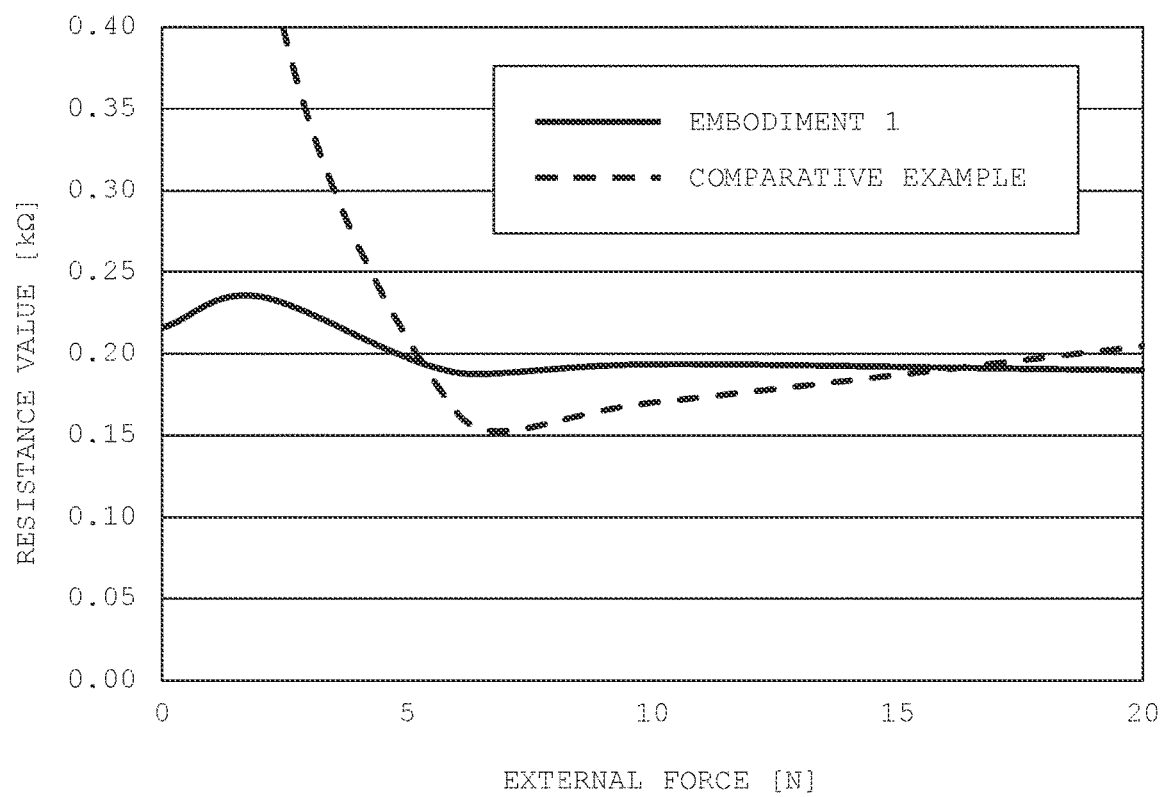

FIG. 7A  MODIFICATION OF EMBODIMENT 1
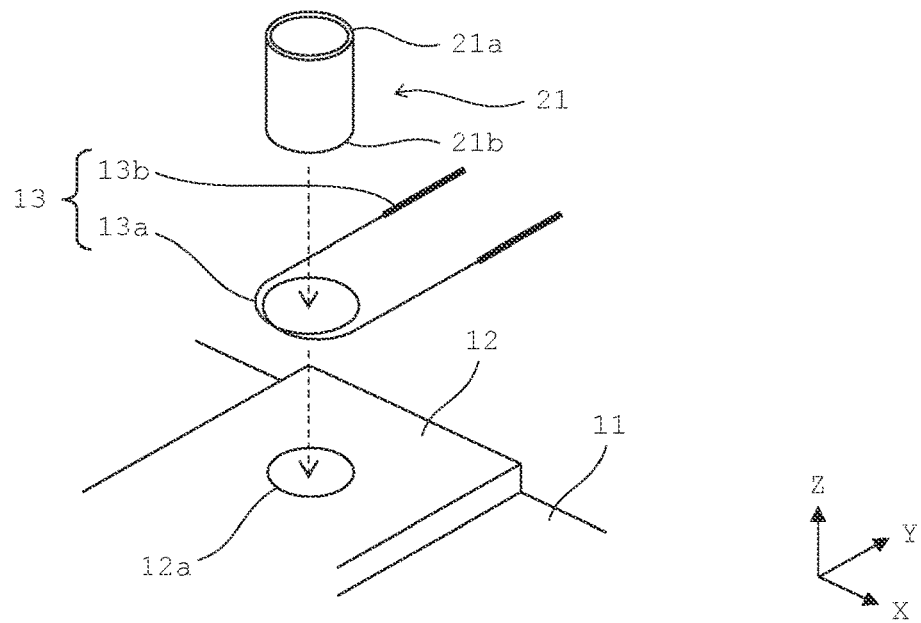
FIG. 7B
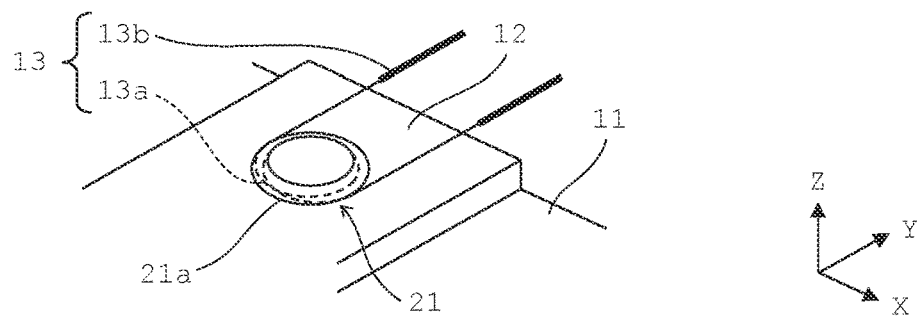
FIG. 7C
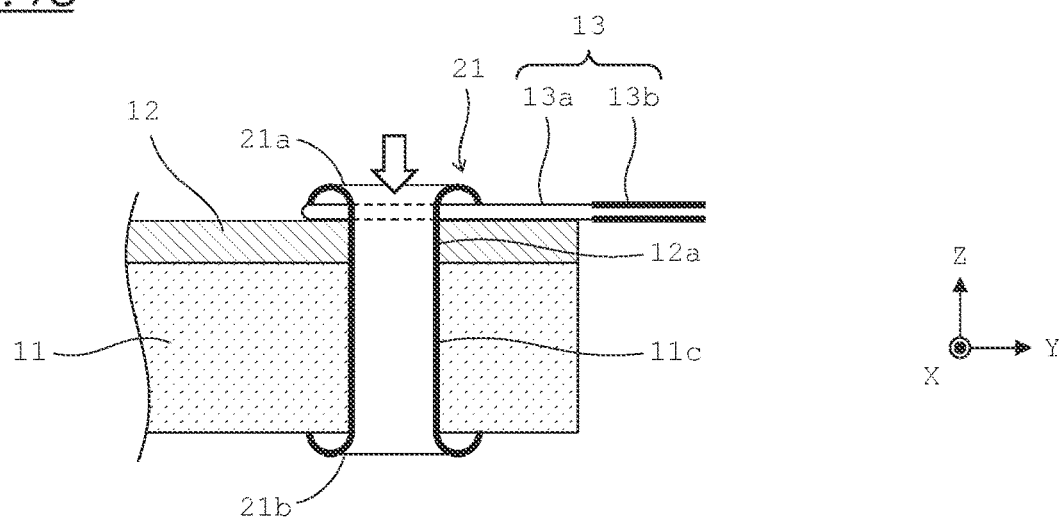

FIG. 9A  EMBODIMENT 2
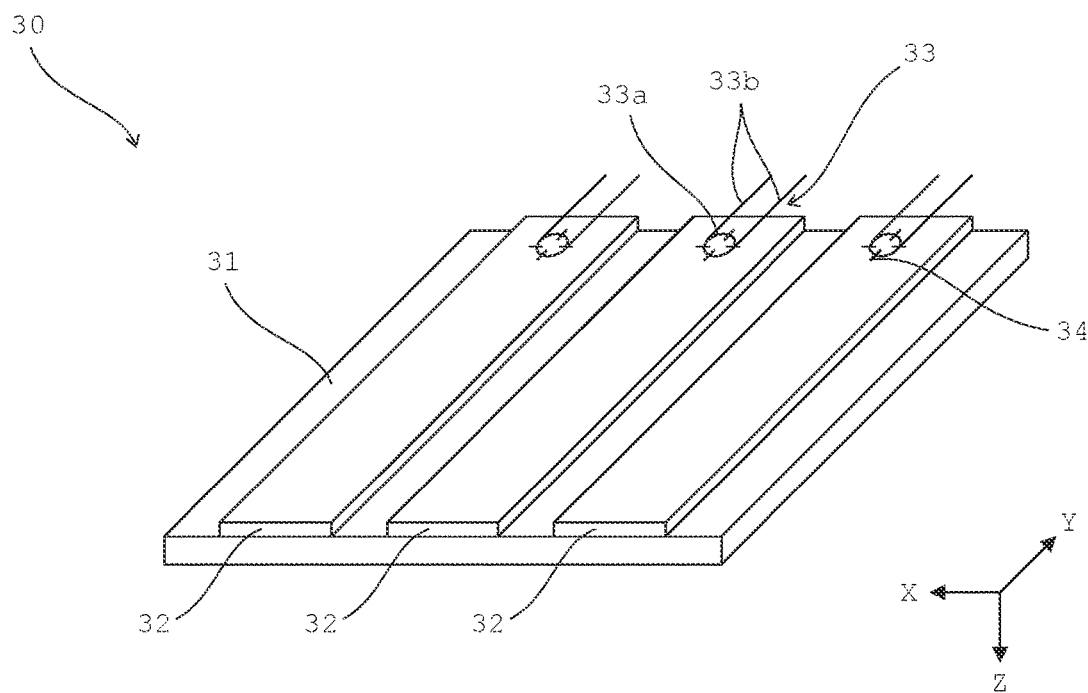
FIG. 9B
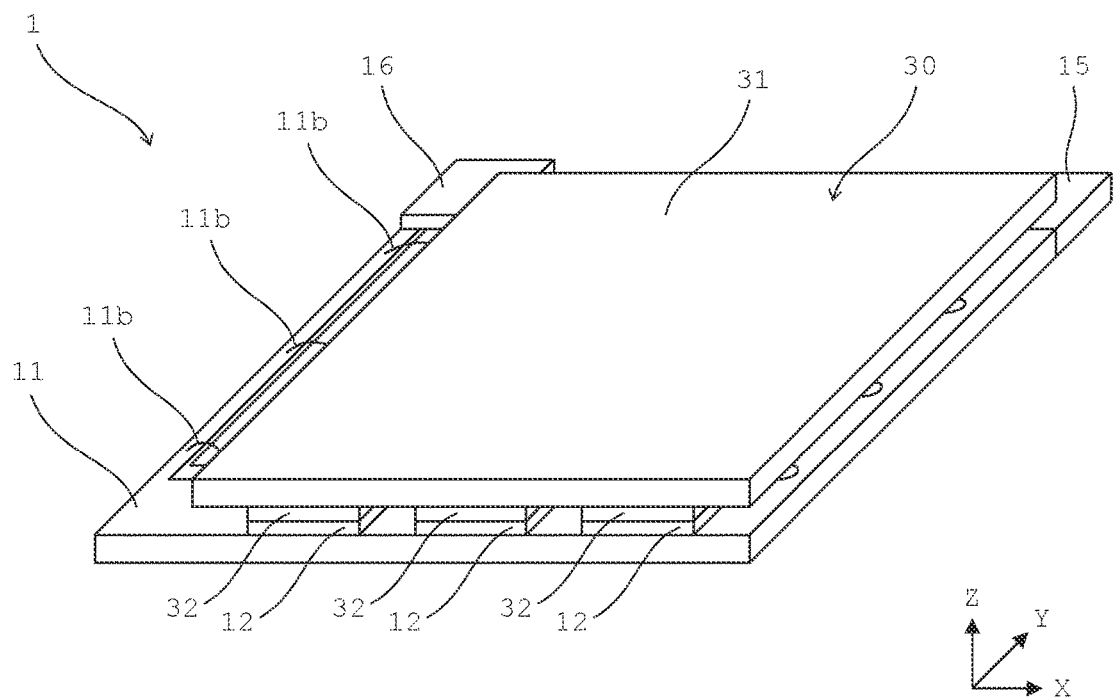

FIG.11A  MODIFICATION OF EMBODIMENT 2
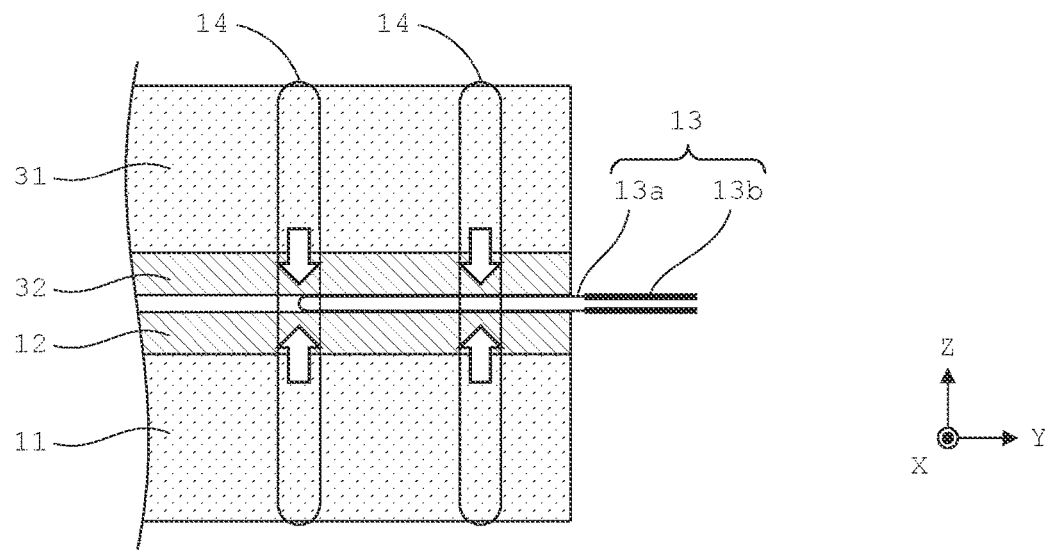
FIG.11B
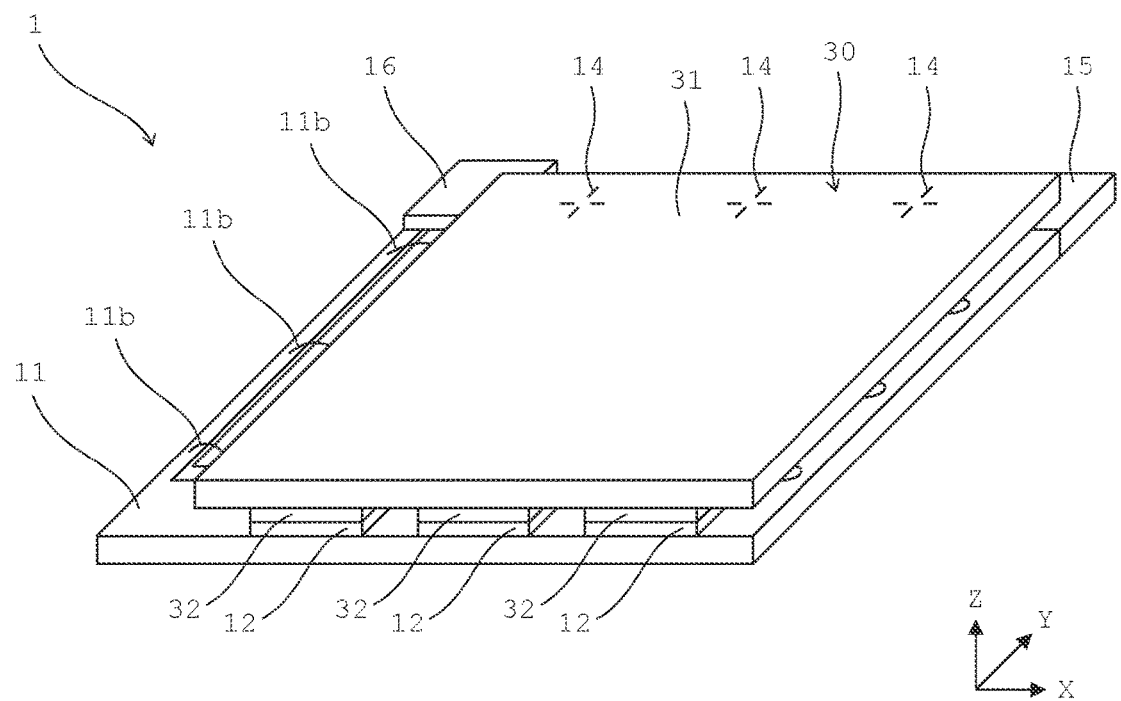

FIG.13A  EMBODIMENT 3
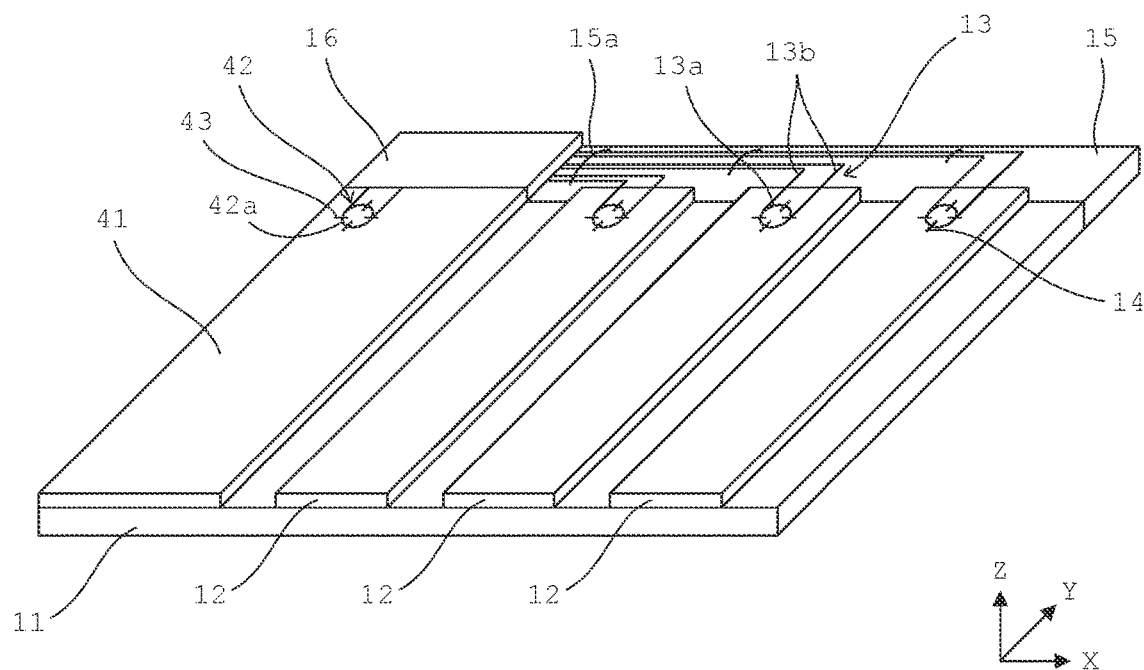
FIG.13B
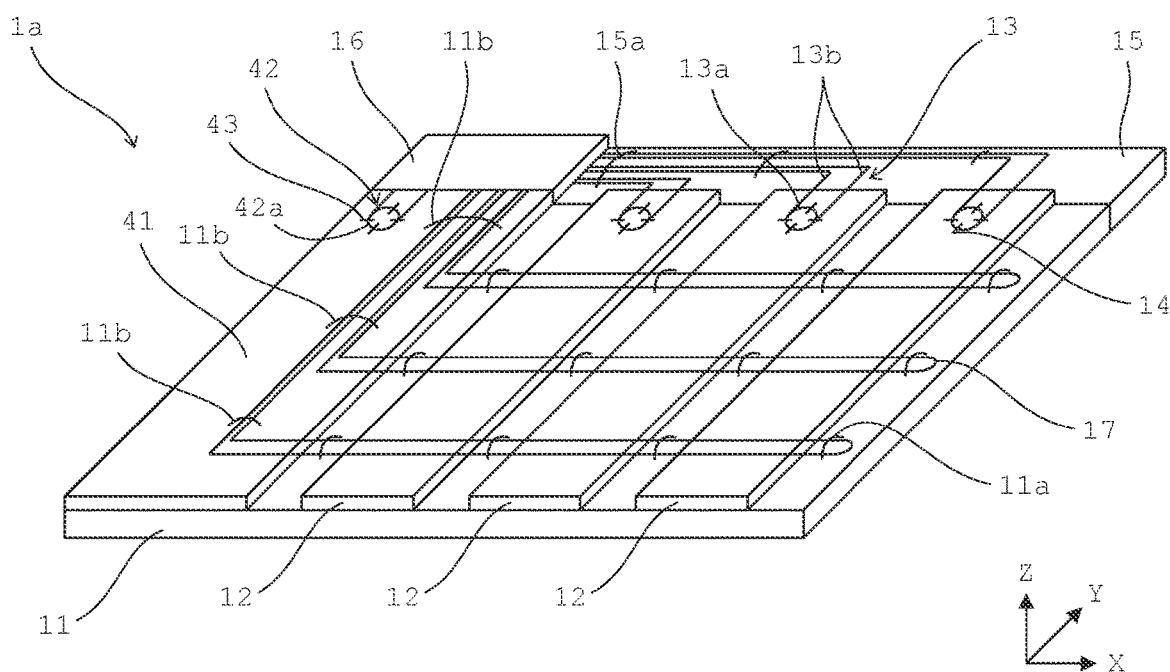

FIG.15A  ANOTHER MODIFICATION
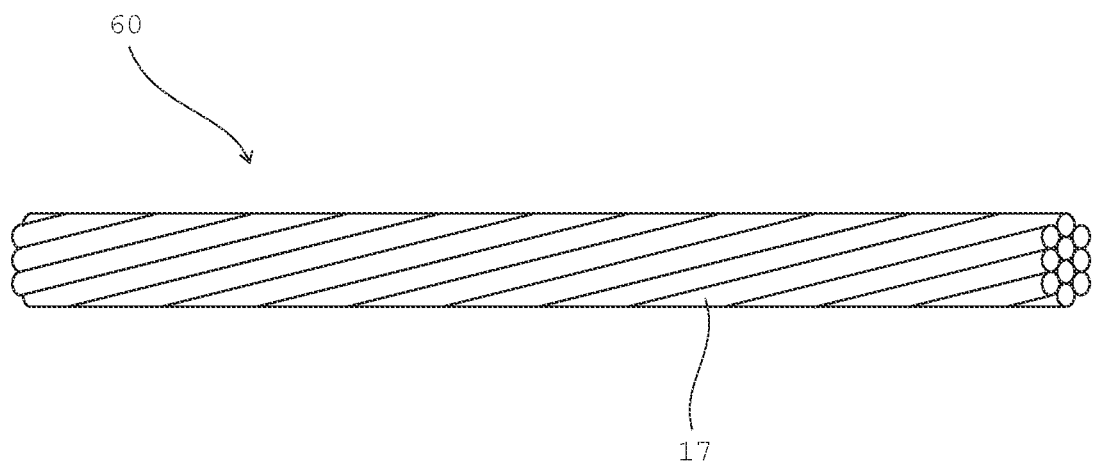
FIG.15B
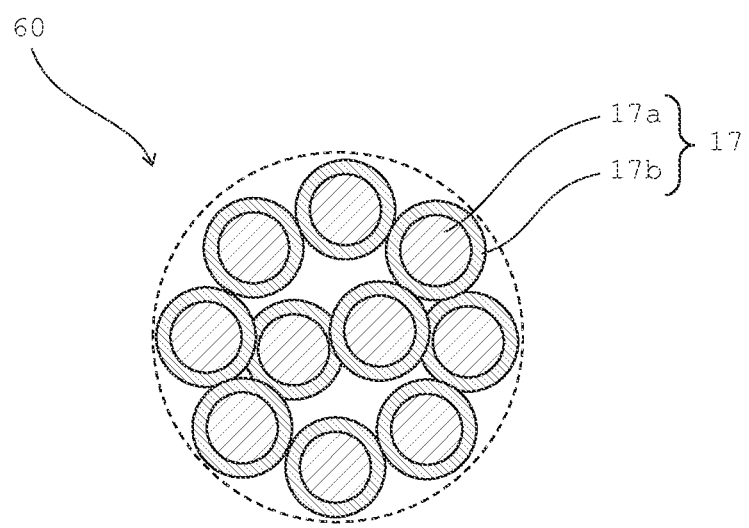

LOAD SENSOR

CROSS REFERENCE TO RELATED APPLICATION

This application is a continuation of International Application No. PCT/JP2020/040108 filed on Oct. 26, 2020, entitled "LOAD SENSOR", which claims priority under 35 U.S.C. Section 119 of Japanese Patent Application No. 2019-196686 filed on Oct. 29, 2019, entitled "LOAD SENSOR". The disclosures of the above applications are incorporated herein by reference.

BACKGROUND OF THE INVENTION

1. Field of the Invention

The present invention relates to a load sensor that detects a load applied from outside, on the basis of change in capacitance.

2. Disclosure of Related Art

Load sensors are widely used in the fields of industrial apparatuses, robots, vehicles, and the like. In recent years, in accordance with advancement of control technologies by computers and improvement of design, development of electronic apparatuses that use a variety of free-form surfaces such as those in human-form robots and interior equipment of automobiles is in progress. In association therewith, it is required to mount a high performance load sensor to each free-form surface.

Japanese Patent No. 5278038 describes an elastomer transducer that includes a dielectric rubber composition and a pair of electrically-conductive rubber compositions disposed on the upper side and the lower side of the dielectric rubber composition. In this elastomer transducer, a copper electrode is adhered to each electrically-conductive rubber composition by an electrically-conductive adhesive.

International Publication No. WO2017/022258 describes a capacitance-type sensor that includes a dielectric layer and a plurality of electrode units disposed on both sides in a front-back direction of the dielectric layer. In this capacitance-type sensor, the electrode unit includes an insulating layer having a through-hole, an electrode layer disposed on one face in the front-back direction of the insulating layer, and a jumper wiring layer disposed on the other face in the front-back direction of the insulating layer and electrically connected to the electrode layer via the through-hole, and the jumper wiring layer includes rubber and an electrically-conductive material.

In the load sensor as in Japanese Patent No. 5278038, the elasticities of the electrically-conductive rubber composition and the copper electrode are different from each other. Thus, when the electrically-conductive rubber composition stretches and contracts, the adhesive may be detached, whereby joint between the electrically-conductive rubber composition and the copper electrode may be impaired. In the load sensor as in International Publication No. WO2017/022258, the jumper wiring layer is formed from rubber and an electrically-conductive material. Thus, although the jumper wiring layer can follow the stretch and contraction of the electrode layer, the jumper wiring layer has a high resistance value.

SUMMARY OF THE INVENTION

A first mode of the present invention relates to a load sensor. The load sensor according to the present mode includes: an element part in which capacitance changes in accordance with a load; a copper wire drawn from the element part in order to detect change in the capacitance; and a fixation tool configured to fix the copper wire to the element part. The element part includes an electrically-conductive elastic body that is electrically conductive and that forms one pole for the capacitance, and the fixation tool presses and fixes the copper wire to a surface of the electrically-conductive elastic body so as to be movable with respect to the surface of the electrically-conductive elastic body in accordance with elastic deformation of the electrically-conductive elastic body.

According to the load sensor of the present mode, the copper wire is movable while being in contact with the electrically-conductive elastic body, in accordance with elastic deformation of the electrically-conductive elastic body. Therefore, even when the electrically-conductive elastic body has been elastically deformed due to stretch and contraction, etc., the connection between the copper wire and the electrically-conductive elastic body is maintained. In addition, since drawing with respect to the electrically-conductive elastic body is realized by means of the copper wire, the electric resistance of wiring for drawing is not increased. Further, since the copper wire is pressed and fixed to the surface of the electrically-conductive elastic body, even when an external force is applied to the connection place between the copper wire and the electrically-conductive elastic body, change due to this external force in the resistance value at the connection place can be suppressed. Therefore, while the resistance value of the wiring drawn from the element part is suppressed to be small, change due to an external force in the resistance value at the connection place of the wiring to the element part can be suppressed, and reliability in the connection between the element part and the wiring can be enhanced.

A second mode of the present invention relates to a load sensor. The load sensor according to the present mode includes: an element part in which capacitance changes in accordance with a load; a first copper wire drawn from the element part in order to detect change in the capacitance; a second copper wire drawn from the element part in order to detect change in the capacitance, the second copper wire being covered by a dielectric body; and a circuit connection terminal configured to connect the element part to an external electronic circuit. The element part includes an electrically-conductive elastic body that is electrically conductive and that forms one pole for the capacitance, the first copper wire is connected to the electrically-conductive elastic body, and the second copper wire, in a state of being in contact with the electrically-conductive elastic body, is disposed in the element part, and forms an other pole for the capacitance, and a portion, of the second copper wire, drawn from the element part is directly connected to the circuit connection terminal.

According to the load sensor of the present mode, since the second copper wire also serves as wiring for drawing, there is no need to separately provide wiring for drawing. In addition, since the second copper wire is in a state of being in contact with the electrically-conductive elastic body, when the electrically-conductive elastic body has been elastically deformed, the second copper wire moves relative to the surface of the electrically-conductive elastic body while being in contact with the surface of the electrically-conductive elastic body. Therefore, even when the electrically-conductive elastic body has been elastically deformed due to stretch and contraction, etc., the connection between the second copper wire and the electrically-conductive elastic body is maintained. Since the second copper wire is also used as wiring for drawing, the electric resistance of the wiring for drawing is not increased. Therefore, while the resistance value of the wiring drawn from the element part is suppressed to be small, reliability in the connection between the electrically-conductive elastic body and the wiring can be enhanced.

BRIEF DESCRIPTION OF THE DRAWINGS

FIG. 6A and FIG. 6B are cross-sectional views schematically showing configurations of experiments according to Embodiment 1 and a comparative example, respectively;

FIG. 6C is a graph showing an experimental result regarding a relationship between external force and resistance value, according to Embodiment 1 and the comparative example;

FIG. 7A and FIG. 7B are each a perspective view schematically showing an end portion on the Y-axis positive side of an electrically-conductive elastic body, a connection part of a covered copper wire, and an eyelet, according to a modification of Embodiment 1;

FIG. 7C is a side view schematically showing a cut surface along a plane parallel to a Y-Z plane passing through the center of the connection part, according to the modification of Embodiment 1;

FIG. 9A is a perspective view schematically showing a configuration of a structure on the upper side according to Embodiment 2;

FIG. 9B is a perspective view schematically showing a load sensor of which assembling has been completed, according to Embodiment 2;

FIG. 11A is a side view schematically showing a cut surface along a plane parallel to a Y-Z plane passing through the center of a connection part, according to a modification of Embodiment 2;

FIG. 11B is a perspective view schematically showing a load sensor of which assembling has been completed, according to the modification of Embodiment 2;

FIG. 13A is a perspective view schematically showing a shield layer, covered copper wires, and threads according to Embodiment 3;

FIG. 13B is a perspective view schematically showing a configuration of a structure on the lower side according to Embodiment 3;

FIG. 15A is an enlarged diagram schematically showing a configuration of a covered copper wire according to another modification;

FIG. 15B is a cross-sectional view schematically showing a configuration of the covered copper wire according to another modification;

Figure 1A:
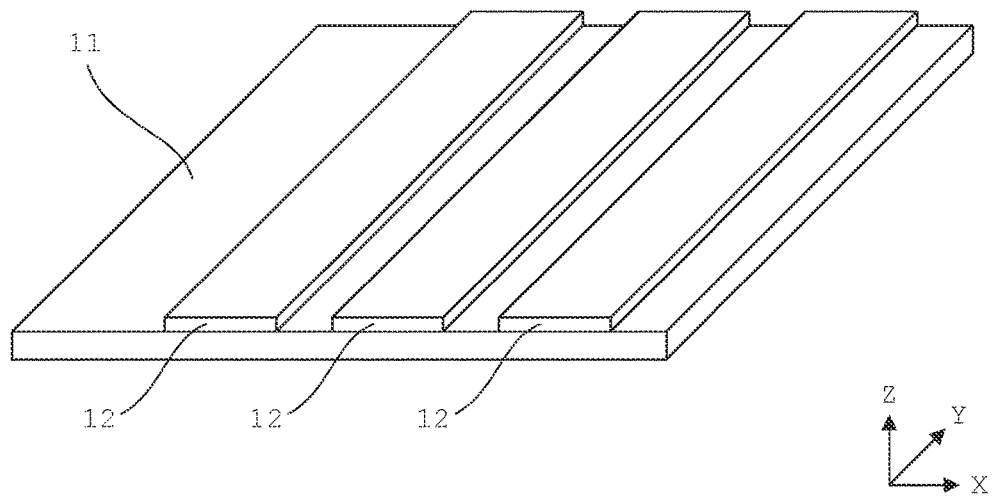
FIG. 1A is a perspective view schematically showing a base member and electrically-conductive elastic bodies according to Embodiment 1.

It should be noted that the drawings are solely for description and do not limit the scope of the present invention in any way.

DESCRIPTION OF PREFERRED EMBODIMENTS

The present invention is applicable to a load sensor of a management system or an electronic apparatus that performs processing in accordance with an applied load.

Examples of the management system include a stock management system, a driver monitoring system, a coaching management system, a security management system, and a caregiving/nursing management system.

In the stock management system, for example, by a load sensor provided to a stock shelf, the load of a placed stock is detected, and the kinds of commodities and the number of commodities present on the stock shelf are detected. Accordingly, in a store, a factory, a warehouse, and the like, the stock can be efficiently managed, and manpower saving can be realized. In addition, by a load sensor provided in a refrigerator, the load of food in the refrigerator is detected, and the kinds of the food and the quantity and amount of the food in the refrigerator are detected. Accordingly, a menu that uses food in a refrigerator can be automatically proposed.

In the driver monitoring system, by a load sensor provided to a steering device, the distribution of a load (e.g., gripping force, grip position, tread force) applied on the steering device by a driver is monitored, for example. In addition, by a load sensor provided to a vehicle-mounted seat, the distribution of a load (e.g., the position of the center of gravity) applied on the vehicle-mounted seat by the driver in a seated state is monitored. Accordingly, the driving state (sleepiness, mental state, and the like) of the driver can be fed back.

In the coaching management system, for example, by a load sensor provided to the bottom of a shoe, the load distribution at a sole is monitored. Accordingly, correction or leading to an appropriate waking state or running state can be realized.

In the security management system, for example, by a load sensor provided to a floor, the load distribution is detected when a person passes, and the body weight, stride, passing speed, shoe sole pattern, and the like are detected. Accordingly, the person who has passed can be identified by checking these pieces of detection information against data.

In the caregiving/nursing management system, for example, by load sensors provided to bedclothes and a toilet seat, the distributions of loads applied by a human body onto the bedclothes and the toilet seat are monitored. Accordingly, at the positions of the bedclothes and the toilet seat, what action the person is going to take is estimated, whereby tumbling or falling can be prevented.

Examples of the electronic apparatus include a vehicle-mounted apparatus (car navigation system, audio apparatus, etc.), a household electrical appliance (electric pot, IH cooking heater, etc.), a smartphone, an electronic paper, an electronic book reader, a PC keyboard, a game controller, a smartwatch, a wireless earphone, a touch panel, an electronic pen, a penlight, lighting clothes, and a musical instrument. In an electronic apparatus, a load sensor is provided to an input part that receives an input from a user.

The embodiments below are of load sensors that are typically provided in a management system or an electronic apparatus as described above. Such a load sensor may be referred to as a "capacitance-type pressure-sensitive sensor element", a "capacitive pressure detection sensor element", a "pressure-sensitive switch element", or the like. The embodiments below are examples of embodiments of the present invention, and the present invention is not limited to the embodiments below in any way.

Hereinafter, embodiments of the present invention will be described with reference to the drawings. For convenience, X-, Y-, and Z-axes orthogonal to each other are provided in the drawings. The Z-axis direction is the height direction of a load sensor 1.

Embodiment 1

With reference to FIG. 1A to FIG. 3B, a procedure of assembling a load sensor 1 of Embodiment 1 is described.

FIG. 1A is a perspective view schematically showing a base member 11 and three electrically-conductive elastic bodies 12 set on the upper face of the base member 11.

The base member 11 is an insulative member having elasticity. The base member 11 has a flat plate shape parallel to an X-Y plane. The base member 11 is formed from a non-electrically-conductive resin material or a non-electrically-conductive rubber material. The resin material used in the base member 11 is a resin material of at least one type selected from the group consisting of a styrene-based resin, a silicone-based resin (e.g., polydimethylpolysiloxane (PDMS)), an acrylic resin, a rotaxane-based resin, a urethane-based resin, and the like, for example. The rubber material used in the base member 11 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive elastic bodies 12 are set on the upper face (the face on the Z-axis positive side) of the base member 11 with an adhesive or the like. In FIG. 1A, three electrically-conductive elastic bodies 12 are set on the upper face of the base member 11. Each electrically-conductive elastic body 12 is an electrically-conductive member having elasticity. The electrically-conductive elastic bodies 12 each have a band-like shape that is long in the Y-axis direction on the upper face of the base member 11, and are set so as to be separated from each other. Each electrically-conductive elastic body 12 is formed from a resin material and an electrically-conductive filler dispersed therein, or from a rubber material and an electrically-conductive filler dispersed therein.

Similar to the resin material used in the base member 11 described above, the resin material used in the electrically-conductive elastic body 12 is a resin material of at least one type selected from the group consisting of a styrene-based resin, a silicone-based resin (polydimethylpolysiloxane (e.g., PDMS)), an acrylic resin, a rotaxane-based resin, a urethane-based resin, and the like, for example. Similar to the rubber material used in the base member 11 described above, the rubber material used in the electrically-conductive elastic body 12 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive filler used in the electrically-conductive elastic body 12 is a material of at least one type selected from the group consisting of: metal materials such as Au (gold), Ag (silver), Cu (copper), C (carbon), ZnO (zinc oxide), $In_2O_3$ (indium oxide (III)), and $SnO_2$ (tin oxide (IV)); electrically-conductive macromolecule materials such as PEDOT:PSS (i.e., a complex composed of poly(3,4-ethylenedioxythiophene) (PEDOT) and polystyrene sulfonate (PSS)); electrically-conductive fibers such as a metal-coated organic matter fiber and a metal wire (fiber state); and the like, for example.

Figure 1B:
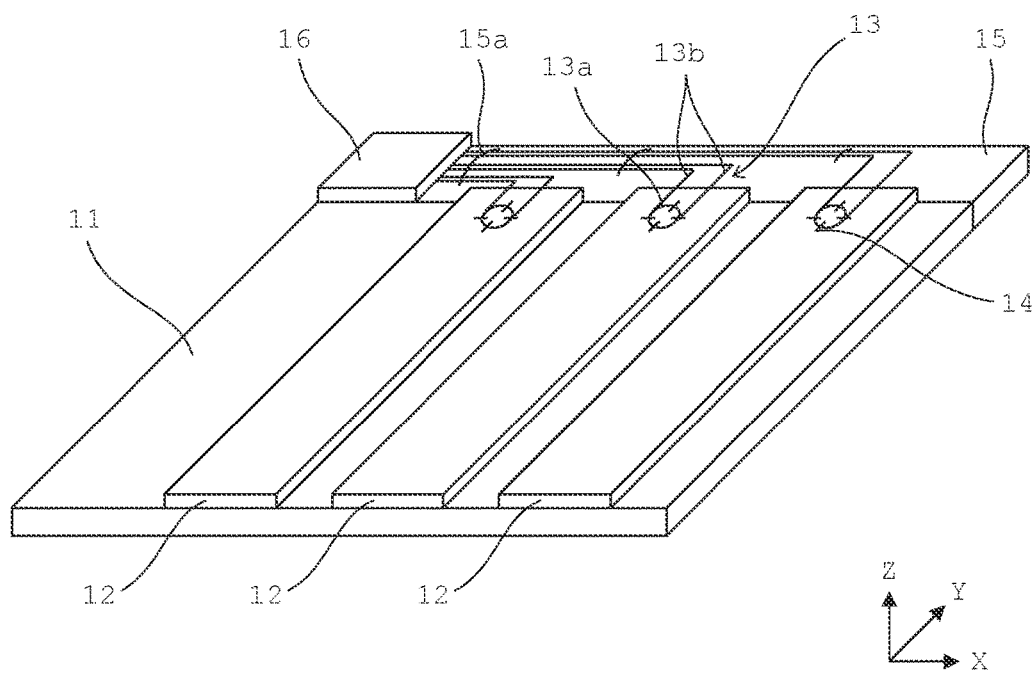
FIG. 1B is a perspective view schematically showing covered copper wires, threads, a wiring fixation base member, and a circuit connection terminal according to Embodiment 1.

FIG. 1B is a perspective view schematically showing three covered copper wires 13, threads 14 provided to each covered copper wire 13, a wiring fixation base member 15, and a circuit connection terminal 16, which are set on the structure shown in FIG. 1A.

Each covered copper wire 13 has a shape in which a pair of covered copper wires are connected at a connection part 13a on the Y-axis negative side. The covered copper wire 13 is composed of a copper wire and a covering member that is insulative and that covers the copper wire. The covering member of the covered copper wire 13 is polyurethane, for example. The covering member has been removed from the connection part 13a, which is one end portion of the covered copper wire 13. For example, the covering member of the connection part 13a is removed as a result of the connection part 13a being subjected to soldering. That is, as a result of the connection part 13a being immersed in a bath containing a high temperature molten solder, the covering member is melted and removed by heat, the connection part 13a is exposed, and the solder is attached to the exposed connection part 13a. The three covered copper wires 13 are set with threads 14 in the vicinities of end portions on the Y-axis positive side of the respective three electrically-conductive elastic bodies 12.

Figure 2A:
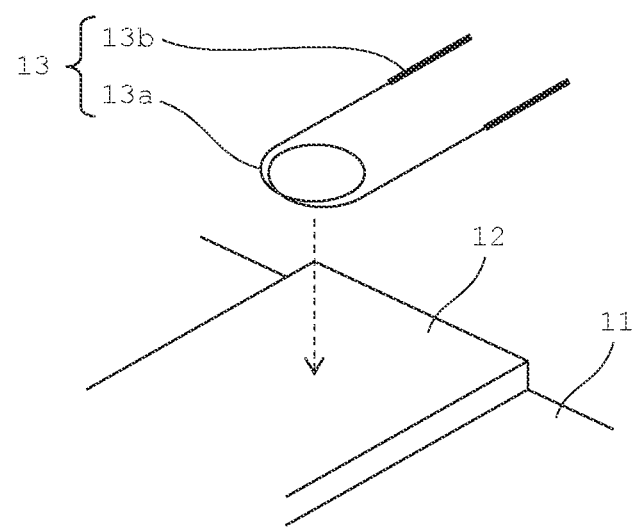
FIG. 2A and FIG. 2B are perspective views schematically showing an end portion on a Y-axis positive side of an electrically-conductive elastic body, a connection part of a covered copper wire, and threads, according to Embodiment 1.
Figure 2B:
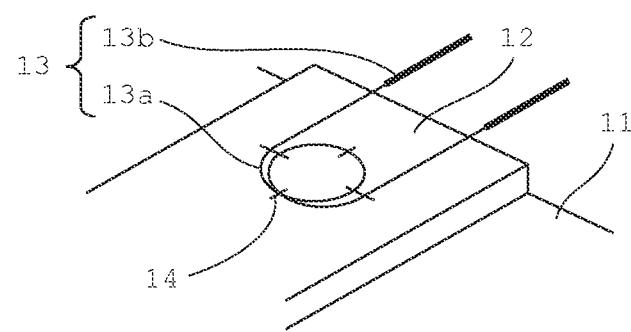

FIG. 2A and FIG. 2B are perspective views schematically showing an end portion on the Y-axis positive side of an electrically-conductive elastic body 12, a connection part 13a of a covered copper wire 13, and threads.

As described above, the connection part 13a of the covered copper wire 13 is in a state where the covering member has been removed and the inner copper wire is exposed. The connection part 13a of the covered copper wire 13 is wound a predetermined number of times (e.g., once) in a circular shape. The thread 14 is formed from an electrically-conductive material, and is composed of a fiber and an electrically-conductive metal material dispersed therein. The electrically-conductive metal material used in the thread 14 is silver, for example. The diameter of the connection part 13a is about 3 mm, and the width in the X-axis direction of the electrically-conductive elastic body 12 is about 10 mm.

At the time of assembly, as shown in FIG. 2A, the connection part 13a is pressed from above (the Z-axis negative direction) against the vicinity of the end portion on the Y-axis positive side of the electrically-conductive elastic body 12. Then, as shown in FIG. 2B, the connection part 13a is fixed to the electrically-conductive elastic body 12 by four threads 14. Four threads 14 are set at four places on the X-axis positive side, the X-axis negative side, the Y-axis positive side, and the Y-axis negative side of the connection part 13a wound in a circular shape. Here, the connection part 13a is fixed by the threads 14 at an interval of 90° in the circumferential direction.

Figure 2C:
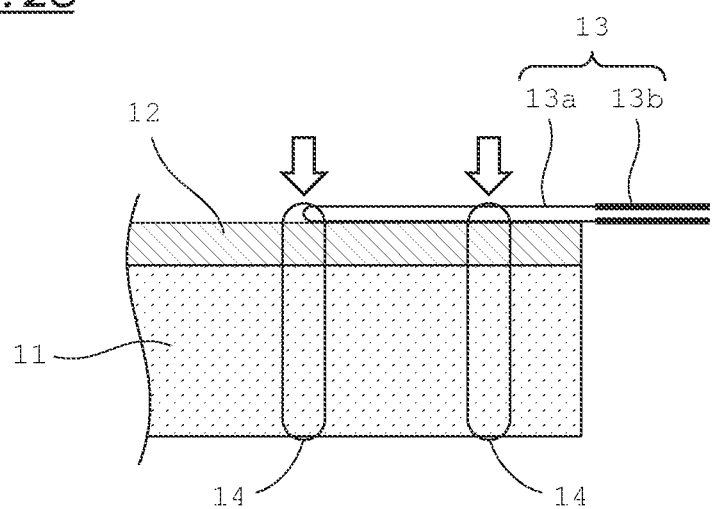
FIG. 2C is a side view schematically showing a cut surface along a plane parallel to a Y-Z plane passing through the center of the connection part, according to Embodiment 1.

FIG. 2C is a side view schematically showing a cross-section obtained when the configuration shown in FIG. 1B is cut along a plane parallel to a Y-Z plane passing through the center of the connection part 13a. In FIG. 2C, for convenience, the covered copper wire 13 extending on the X-axis positive side and the covered copper wire 13 extending on the X-axis negative side are shown so as to be shifted in the Z-axis direction.

Each thread 14 is fastened to the electrically-conductive elastic body 12 and the base member 11 by embroidering so as to extend across, between the inner side and the outer side of, the copper wire exposed in the connection part 13a, and so as to penetrate the electrically-conductive elastic body 12 and the base member 11. Accordingly, as indicated by each white arrow, the thread 14 presses and fixes the connection part 13a to the surface of the electrically-conductive elastic body 12 such that the connection part 13a is movable with respect to the surface of the electrically-conductive elastic body 12.

With reference back to FIG. 1B, the wiring fixation base member 15 and the circuit connection terminal 16 are set on the Y-axis positive side of the base member 11. Covered portions 13b of the covered copper wires 13 are connected, in a state of being bundled by a thread 15a, to the upper face of the wiring fixation base member 15. Each covered portion 13b is a portion where the covering member is provided in the covered copper wire 13. That is, the portion in which the covering member of the covered copper wire 13 remains without being removed by the above-described soldering is the covered portion 13b.

Here, the "state of being bundled" is a state where the positions of the wires are restricted such that the wires are concentrated with the intervals therebetween suppressed. In the description below as well, the "state of being bundled" has the same meaning.

In FIG. 1B, three threads 15a connect the covered portions 13b, at respective three positions, to the wiring fixation base member 15. That is, the covered copper wires 13 drawn from the respective electrically-conductive elastic bodies 12 are bundled at three places and fixed to the upper face of the wiring fixation base member 15. A plurality of covered copper wires 13 may be tied by another thread to be bundled, and then, these covered copper wires 13 may be fixed by the thread 15a to the wiring fixation base member 15.

End portions on the side opposite to the connection part 13a of each covered copper wire 13 is connected to the circuit connection terminal 16. Then, other three covered copper wires 17 are disposed on the upper face of the three electrically-conductive elastic bodies 12 so as to perpendicularly cross the electrically-conductive elastic bodies 12.

Figures 3A, 3B:
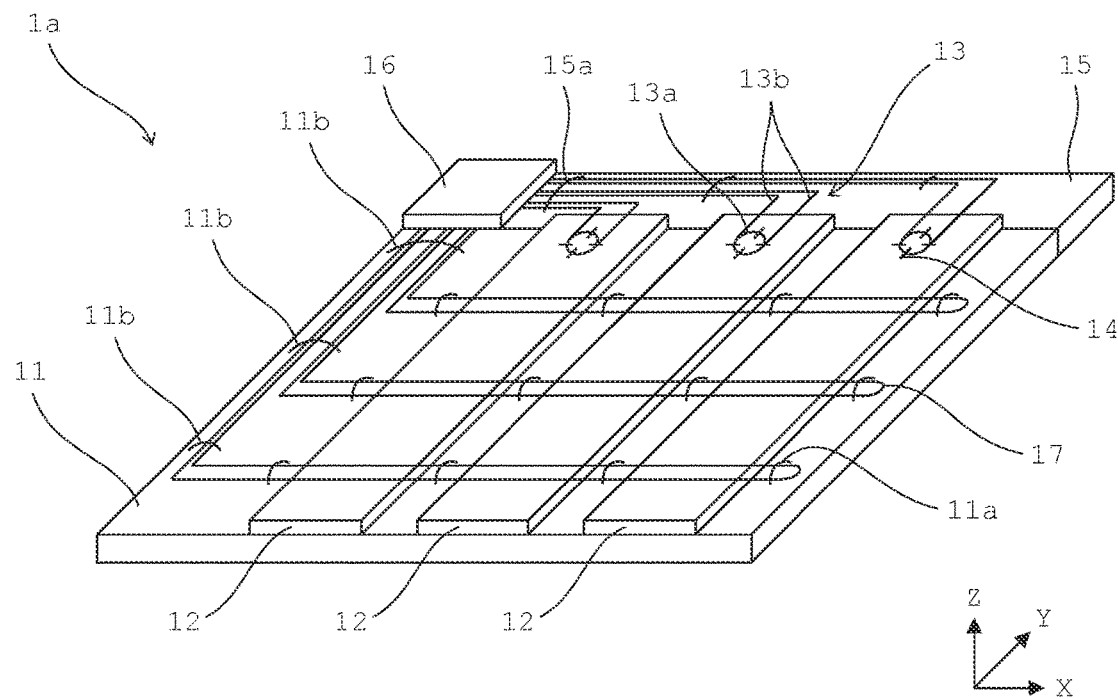
FIG. 3A is a perspective view schematically showing a configuration of a structure on the lower side according to Embodiment 1.
FIG. 3B is a perspective view schematically showing a load sensor of which assembling has been completed, according to Embodiment 1.

FIG. 3A is a perspective view schematically showing three covered copper wires 17 set on the structure shown in FIG. 1B.

Each covered copper wire 17 is bent at an end portion on the X-axis positive side. That is, the covered copper wire 17 has a shape in which a pair of covered copper wires are connected at an end portion on the X-axis positive side. Three covered copper wires 17 are disposed so as to be superposed on the three electrically-conductive elastic bodies 12. In FIG. 3A, the three covered copper wires 17 are disposed so as to be superposed on the upper face of the three electrically-conductive elastic bodies 12.

Each covered copper wire 17 is composed of a wire member that is electrically conductive, and a dielectric body that covers the surface of the wire member. The three covered copper wires 17 are disposed so as to be arranged along the longitudinal direction (the Y-axis direction) of the electrically-conductive elastic bodies 12. Each covered copper wire 17 is disposed, extending in the X-axis direction, so as to extend across the three electrically-conductive elastic bodies 12. End portions on the X-axis negative side of each covered copper wire 17 are bent in the Y-axis positive direction along the upper face of the base member 11, and are connected to the circuit connection terminal 16. That is, the portion, of the covered copper wire 17, that is drawn from the region where the covered copper wire 17 is superposed on the electrically-conductive elastic body 12 is directly connected to the circuit connection terminal 16 without being connected to another wiring. The configuration of the covered copper wire 17 will be described later with reference to FIG. 4A and FIG. 4B.

After the three covered copper wires 17 have been disposed, each covered copper wire 17 is connected to the base member 11 by threads 11a so as to be movable relative to the surface of each electrically-conductive elastic body 12. In FIG. 3A, 12 threads 11a connect the covered copper wires 17 to the base member 11 at positions other than the positions where the electrically-conductive elastic bodies 12 and the covered copper wires 17 overlap each other.

Subsequently, in the vicinity of an end portion on the X-axis negative side of the base member 11, the covered copper wires 17 extending in the Y-axis direction are connected, in a state of being bundled by threads 11b, to the base member 11. In FIG. 3A, three threads 11b connect the covered copper wires 17, at respective three positions, to the base member 11. Accordingly, a structure 1a shown in FIG. 3A is assembled using the three threads 11b.

Subsequently, as shown in FIG. 3B, a base member 20 is set from above the structure 1a shown in FIG. 3A. The base member is an insulative member. The base member 20 is a resin material of at least one type selected from the group consisting of polyethylene terephthalate, polycarbonate, polyimide, and the like, for example. The base member 20 has a flat plate shape parallel to the X-Y plane. Four corners of the base member 20 are connected to the base member 11 by a silicone rubber-based adhesive, a thread, or the like, whereby the base member 20 is fixed to the structure 1a. Accordingly, the load sensor 1 is completed as shown in FIG. 3B.

Figure 4A:
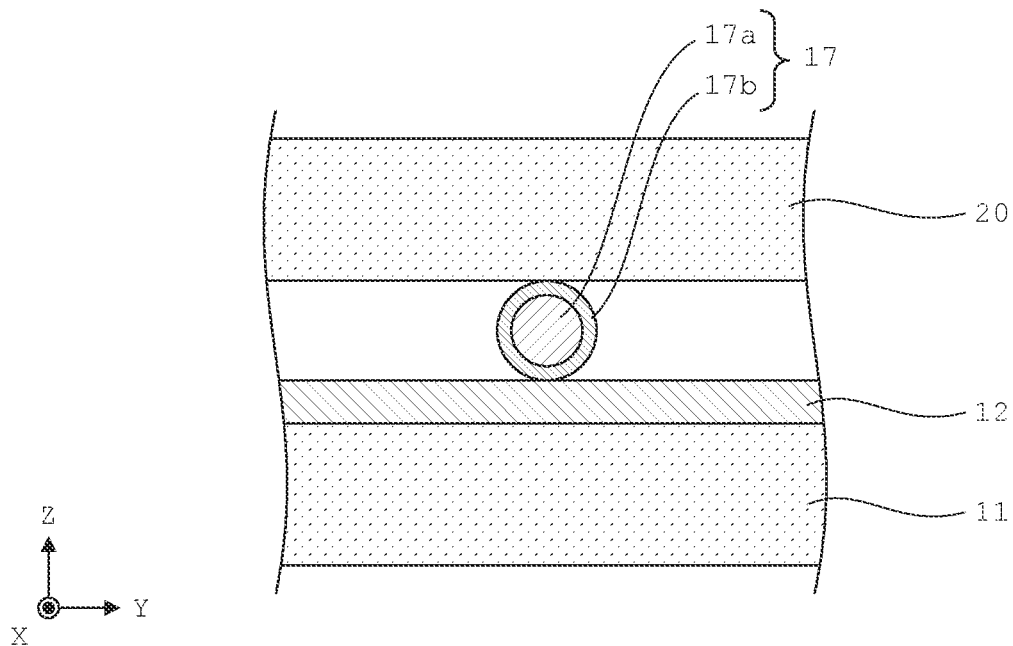
FIG. 4A and FIG. 4B are each a cross-sectional view schematically showing a covered copper wire disposed on the upper face of an electrically-conductive elastic body when viewed in an X-axis negative direction, according to Embodiment 1.
Figure 4B:
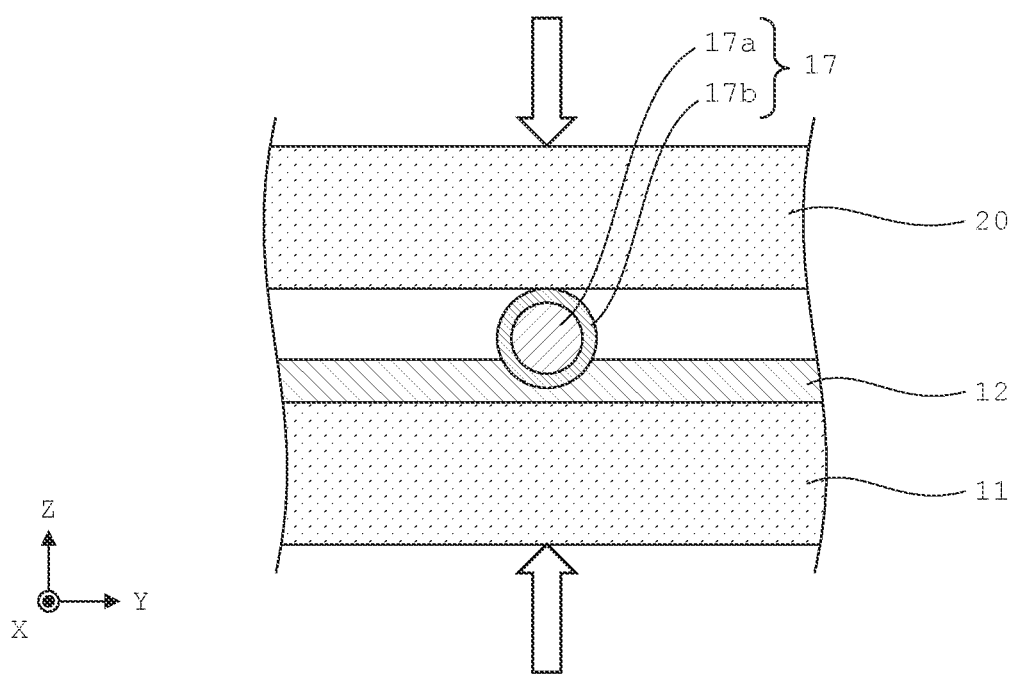

FIG. 4A and FIG. 4B are each a cross-sectional view schematically showing the periphery of a covered copper wire 17 when viewed in the X-axis negative direction. FIG. 4A shows a state where no load is applied, and FIG. 4B shows a state where loads are applied.

As shown in FIG. 4A, the covered copper wire 17 is composed of a copper wire 17a and a dielectric body 17b covering the copper wire 17a. The diameter of the copper wire 17a is about 60 μm, for example. The dielectric body 17b has an electric insulation property, and is formed from a resin material, a ceramic material, a metal oxide material, or the like, for example. The dielectric body 17b may be a resin material of at least one type selected from the group consisting of a polypropylene resin, a polyester resin (e.g., polyethylene terephthalate resin), a polyimide resin, a polyphenylene sulfide resin, a polyvinyl formal resin, a polyurethane resin, a polyamide imide resin, a polyamide resin, and the like, or may be a metal oxide material of at least one type selected from the group consisting of $Al_2O_3$, $Ta_2O_5$, and the like.

When no load is applied to the region shown in FIG. 4A, the force applied between the electrically-conductive elastic body 12 and the covered copper wire 17, and the force applied between the base member 20 and the covered copper wire 17 are substantially zero. From this state, when a load is applied in the upward direction to the lower face of the base member 11, and a load is applied in the downward direction to the upper face of the base member 20 as shown in FIG. 4B, the electrically-conductive elastic body 12 is deformed by the covered copper wire 17. It should be noted that, when the lower face of the base member 11 or the upper face of the base member 20 is placed on a stationary object and a load is applied only to the other base member as well, a load will be similarly received from the stationary object side due to reaction.

As shown in FIG. 4B, when the loads are applied, the covered copper wire 17 is brought close to the electrically-conductive elastic body 12 so as to be wrapped by the electrically-conductive elastic body 12, and the contact area between the covered copper wire 17 and the electrically-conductive elastic body 12 increases. Accordingly, the capacitance between the copper wire 17a in the covered copper wire 17 and the electrically-conductive elastic body 12 changes, the capacitance between two lines corresponding to this region is detected, and the load applied to this region is calculated.

Figure 5:
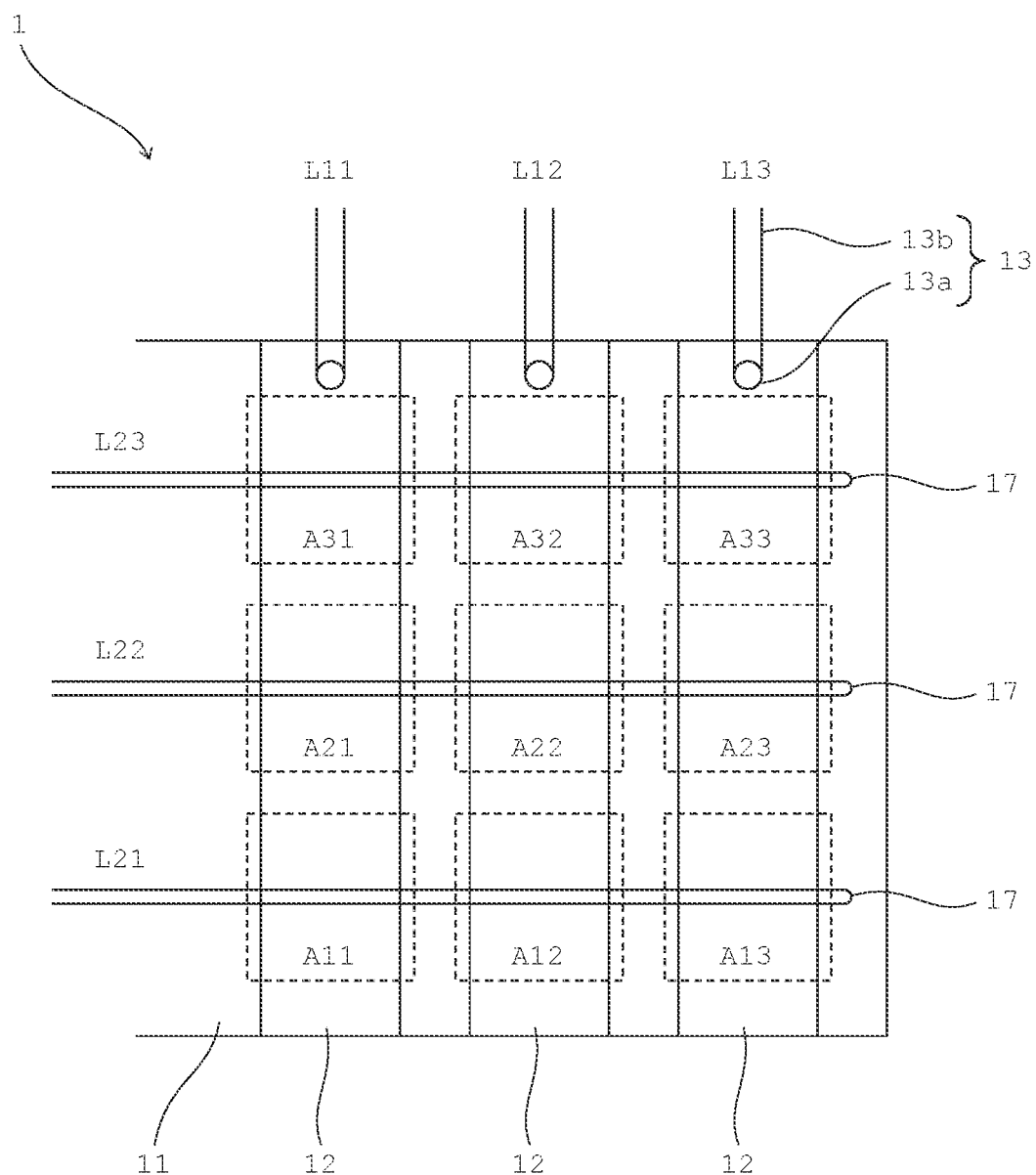
FIG. 5 is a plan view schematically showing the load sensor when viewed in a Z-axis negative direction, according to Embodiment 1.

FIG. 5 is a plan view schematically showing the load sensor 1 when viewed in the Z-axis negative direction. In FIG. 5, for convenience, only the vicinity of the three electrically-conductive elastic bodies 12 is shown, and the threads 14, 11a, 11b, the wiring fixation base member 15, the circuit connection terminal 16, and the base member 20 are not shown.

As shown in FIG. 5, element parts A11, A12, A13, A21, A22, A23, A31, A32, A33 in which capacitance changes in accordance with a load are formed at positions where the three electrically-conductive elastic bodies 12 and the three covered copper wires 17 cross each other. Each element part includes an electrically-conductive elastic body 12 and a covered copper wire 17, the electrically-conductive elastic body 12 forms one pole (e.g., positive pole) for capacitance, and the covered copper wire 17 forms the other pole (e.g., negative pole) for capacitance. When a load is applied in the Z-axis direction to each element part, the covered copper wire 17 is wrapped by the electrically-conductive elastic body 12 due to the load. Accordingly, the contact area between the electrically-conductive elastic body 12 and the covered copper wire 17 changes, and the capacitance between the electrically-conductive elastic body 12 and the covered copper wire 17 changes.

As described above, the three covered copper wires 13 and the three covered copper wires 17 are connected to the circuit connection terminal 16. The circuit connection terminal 16 is a terminal for connecting each element part described above to an external electronic circuit. When the load sensor 1 is used, the circuit connection terminal 16 is connected to the external electronic circuit.

As shown in FIG. 5, the covered copper wires 13 drawn from the three electrically-conductive elastic bodies 12 are referred to as lines L11, L12, L13, and the three covered copper wires 17 drawn from the three electrically-conductive elastic bodies 12 are referred to as lines L21, L22, L23. The positions at which the line L21 crosses the electrically-conductive elastic bodies 12 connected to the lines L11, L12, L13 are the element parts A11, A12, A13, respectively. The positions at which the line L22 crosses the electrically-conductive elastic bodies 12 connected to the lines L11, L12, L13 are the element parts A21, A22, A23, respectively. The positions at which the line L23 crosses the electrically-conductive elastic bodies 12 connected to the lines L11, L12, L13 are the element parts A31, A32, A33, respectively.

When a load is applied to the element part A11, the contact area between the electrically-conductive elastic body 12 and the covered copper wire 17 increases in the element part A11. Therefore, when the capacitance between the line L11 and the line L21 is detected, the load applied to the element part A11 can be calculated. Similarly, in another element part as well, when the capacitance between the two lines crossing each other in the other element part is detected, the load applied to the other element part can be calculated.

As described above, the three lines L11, L12, L13 and the three lines L21, L22, L23 are connected to the circuit connection terminal 16. By an external device connected to the circuit connection terminal 16, the capacitance according to combinations of the three electrically-conductive elastic bodies 12 and the three covered copper wires 17 can be detected.

For example, when one of the three lines L11, L12, L13 is selectively connected to the ground, and the voltage between the line connected to the ground and one of the three lines L21, L22, L23 is detected, the capacitance in the element part to which the two lines are connected and in which the covered copper wire 17 and the electrically-conductive elastic body 12 cross each other, can be detected. Specifically, on the basis of the time until a predetermined amount of electric charge is accumulated in an element part, the capacitance in the element part is detected. On the basis of this capacitance, the load applied to the element part is calculated.

Next, the inventors conducted an experiment of verifying effects brought about by pressing and fixing the connection part 13a of the covered copper wire 13 to the electrically-conductive elastic body 12 by threads 14, as shown in FIG. 2C.

In the present experiment, as shown in FIG. 6A and FIG. 6B, the inventors used a configuration that corresponds to only the vicinity of the connection part 13a shown in FIG. 2B. In FIG. 6A and FIG. 6B, for convenience, out of the wound connection part 13a, a portion on the Y-axis positive side is shown. In FIG. 6A and FIG. 6B, the configurations similar to those in the load sensor 1 above are denoted by the same reference characters.

FIG. 6A is a cross-sectional view schematically showing a configuration (Embodiment 1) in which the connection part 13a of the covered copper wire 13 is pressed against the electrically-conductive elastic body 12 in advance by the thread 14. In the configuration of Embodiment 1 in FIG. 6A, the connection part 13a is pressed and fixed to the surface of the electrically-conductive elastic body 12 such that not less than 30% of the surface area of the connection part 13a is in contact with the electrically-conductive elastic body 12. Accordingly, as shown in FIG. 6A, the connection part 13a sinks in the electrically-conductive elastic body 12. On the other hand, FIG. 6B is a cross-sectional view schematically showing a configuration (comparative example) in which the connection part 13a of the covered copper wire 13 is placed on the surface of the electrically-conductive elastic body 12 without being fixed to the electrically-conductive elastic body 12.

In the configurations in FIG. 6A and FIG. 6B, the inventors applied an external force from the upper base member 20 to the position of the connection part 13a, and measured the resistance value between the connection part 13a and the electrically-conductive elastic body 12.

FIG. 6C is a graph showing experimental results regarding a relationship between external force and resistance value with respect to the configurations (Embodiment 1/comparative example) shown in FIG. 6A and FIG. 6B. The horizontal axis represents the magnitude of the external force applied to the connection part 13a, and the vertical axis represents the resistance value between the connection part 13a and the electrically-conductive elastic body 12.

In the case of the comparative example, in a range in which the external force applied to the connection part 13a is not greater than 4 N, variation in the resistance value is very large, and when the load exceeds 4 N, variation in the resistance value becomes small. In the case of the comparative example, when the external force applied to the connection part 13a is small, the contact between the connection part 13a and the electrically-conductive elastic body 12 is unstable, and thus, variation in the resistance value becomes very large. On the other hand, in the configuration of the comparative example, when the external force applied to the connection part 13a becomes large, the connection part 13a sinks in the electrically-conductive elastic body 12, and the contact between the connection part 13a and the electrically-conductive elastic body 12 is stabilized, and thus, variation in the resistance value becomes small. Thus, in the case of the comparative example, the resistance value changes to a great extent in accordance with the magnitude of the external force applied to the connection part 13a.

In contrast to this, in the case of Embodiment 1, regardless of the magnitude of the external force applied to the connection part 13a, variation in the resistance value is small. In the case of Embodiment 1, even in a state where the external force applied the connection part 13a is zero, the connection part 13a is pressed against the electrically-conductive elastic body 12 by the thread 14, and not less than 30% of the surface area of the connection part 13a is in contact with the electrically-conductive elastic body 12, as shown in FIG. 6A. Therefore, regardless of the magnitude of the external force, the connection part 13a is always sunk in the electrically-conductive elastic body 12, and the contact between the connection part 13a and the electrically-conductive elastic body 12 is in a stable state. Thus, variation in the resistance value can be suppressed to be small.

As described above, in the load sensor 1, on the basis of the time until a predetermined amount of electric charge is accumulated in an element part, the capacitance in the element part is detected. However, when the load sensor 1 is to be set, a mechanism, a member, or the like other than the load sensor 1 may come into contact with the position, in the base member 20, that corresponds to the connection part 13a, whereby an external force may be applied to the connection part 13a. In such a case, when variation in the resistance value between the connection part 13a and the electrically-conductive elastic body 12 with respect to the external force is large as in the comparative example above, the time until a predetermined amount of electric charge is accumulated in the element part will be unintentionally varied in accordance with the magnitude of the external force. In this case, the capacitance in the element part cannot be appropriately detected, and thus, the load applied to the element part cannot be appropriately calculated.

In contrast to this, according to the configuration of Embodiment 1, even when an external force is applied to the connection part 13a, variation in the resistance value between the connection part 13a and the electrically-conductive elastic body 12 with respect to the magnitude of the external force is suppressed to be small. Thus, unintended time variation until the predetermined amount of electric charge is accumulated in the element part is suppressed. Therefore, according to the configuration of Embodiment 1, the capacitance in the element part can be appropriately detected, and thus, the load applied to the element part can be appropriately calculated.

Effects of Embodiment 1

According to Embodiment 1, the following effects are exhibited.

The covered copper wire 13 is movable while being in contact with the electrically-conductive elastic body 12, in accordance with elastic deformation of the electrically-conductive elastic body 12. Therefore, even when the electrically-conductive elastic body 12 has been elastically deformed due to stretch and contraction, etc., the connection between the covered copper wire 13 and the electrically-conductive elastic body 12 is maintained. In addition, since drawing with respect to the electrically-conductive elastic body 12 is realized by means of the covered copper wire 13, the electric resistance of wiring for drawing is not increased. Further, since the connection part 13a of the covered copper wire 13 is pressed and fixed to the surface of the electrically-conductive elastic body 12, even when an external force is applied to the connection place between the covered copper wire 13 and the electrically-conductive elastic body 12, i.e., the position of the connection part 13a, change due to this external force in the resistance value at the connection place, i.e., the resistance value between the connection part 13a and the electrically-conductive elastic body 12, can be suppressed. Therefore, while the resistance value of the wiring drawn from each element part A11 to A13, A21 to A23, A31 to A33 shown in FIG. 5 can be suppressed to be small, change due to an external force in the resistance value at the connection place of the wiring (the covered copper wire 13) to the element part can be suppressed, and reliability in the connection between the element part and the wiring can be enhanced.

The connection part 13a of the covered copper wire 13 is pressed and fixed to the surface of the electrically-conductive elastic body 12 such that not less than 30% of the surface area of the connection part 13a is in contact with the electrically-conductive elastic body 12. Accordingly, as shown in FIG. 6C, even when the external force changes, variation in the resistance value between the connection part 13a and the electrically-conductive elastic body 12 is small, and thus, unintended time variation until a predetermined amount of electric charge is accumulated in the element part is suppressed. Therefore, the capacitance in the element part can be appropriately detected, and thus, the load applied to the element part can be appropriately calculated. In the following embodiments and modifications as well, it is preferable that the connection part connected to the electrically-conductive elastic body is pressed and fixed to the surface of the electrically-conductive elastic body such that not less than 30% of the surface area of the connection part is in contact with the electrically-conductive elastic body.

As shown in FIG. 2A to FIG. 2C, the covered copper wire 13 is sewn to the electrically-conductive elastic body 12 by threads 14 in a state where the covered copper wire 13 is placed on the surface of the electrically-conductive elastic body 12. Accordingly, the regions where the threads 14 are provided to the electrically-conductive elastic body 12 are significantly small, and thus, the covered copper wire 13 can be connected to the electrically-conductive elastic body 12 while original properties of the electrically-conductive elastic body 12 are maintained.

As shown in FIG. 2B, the connection part 13a of the covered copper wire 13 is fixed to the surface of the electrically-conductive elastic body 12 by threads 14, in a state where the connection part 13a extends along a looped shape on the surface of the electrically-conductive elastic body 12. Accordingly, the contact area between the covered copper wire 13 and the surface of the electrically-conductive elastic body 12 can be increased. Therefore, the contact resistance between the covered copper wire 13 and the electrically-conductive elastic body 12 can be reduced, and change in the capacitance can be more accurately detected.

Each thread 14 is formed by an electrically-conductive metal material being attached to the surface of a fiber. Therefore, the thread 14 has electrical conductivity, and thus, the contact resistance between the covered copper wire 13 and the electrically-conductive elastic body 12 can be reduced. Therefore, change in the capacitance can be more accurately detected.

The covered copper wire 13 is a covered copper wire that is covered by a covering member that is insulative, and the covering member has been removed in the connection part 13a of the covered copper wire 13. Therefore, even when the covered copper wire 13 drawn from each element part comes into contact with another material that is electrically conductive, the covered copper wire 13 and the other material are electrically insulated from each other by the insulative covering member. Therefore, at the time of setting or the like of the load sensor 1, handling of the covered copper wire 13 can be easily performed.

As a result of the connection part 13a of the covered copper wire 13 being subjected to soldering, the covering member is removed from the connection part 13a. Thus, when soldering is used, the covering member can be smoothly removed.

As shown in FIG. 5, in the load sensor 1, a plurality of element parts A11 to A13, A21 to A23, A31 to A33 in each of which capacitance changes in accordance with a load are provided, and a plurality of covered copper wires 13 respectively drawn from the plurality of element parts are fixed, in a state of being bundled, to the wiring fixation base member 15. Accordingly, the covered copper wires 13 can be put together in a compact manner, and the volume occupied by the covered copper wires 13 can be reduced. Therefore, handling of the covered copper wires 13 can be easily performed.

Since each covered copper wire 17 also serves as wiring for drawing from an element part, there is no need to separately provide wiring for drawing. In addition, since the covered copper wire 17 is in a state of being in contact with the electrically-conductive elastic body 12, when the electrically-conductive elastic body 12 has been elastically deformed, the covered copper wire 17 moves relative to the surface of the electrically-conductive elastic body 12 while being in contact with the surface of the electrically-conductive elastic body 12. Therefore, even when the electrically-conductive elastic body 12 has been elastically deformed due to stretch and contraction, etc., the connection between the covered copper wire 17 and the electrically-conductive elastic body 12 is maintained. Since the covered copper wire 17 is also used as wiring for drawing, the electric resistance of the wiring for drawing is not increased. Therefore, while the resistance value of the wiring drawn from the element part is suppressed to be small, reliability in the connection between the electrically-conductive elastic body 12 and the wiring can be enhanced.

As shown in FIG. 5, in the load sensor 1, a plurality of element parts A11 to A13, A21 to A23, A31 to A33 in each of which capacitance changes in accordance with a load are provided, and a plurality of covered copper wires 17 respectively drawn from the plurality of element parts are fixed, in a state of being bundled, to the base member 11. Accordingly, the covered copper wire 17 can be put together in a compact manner, and the volume occupied by the covered copper wires 17 can be reduced. Therefore, handling of the covered copper wires 17 can be easily performed.

A plurality of electrically-conductive elastic bodies 12 that are long in the Y-axis direction are disposed so as to be arranged in the X-axis direction, and a plurality of covered copper wires 17 that extend across the plurality of electrically-conductive elastic bodies 12 are disposed so as to be arranged in the Y-axis direction. Accordingly, as shown in FIG. 5, a plurality of element parts A11 to A13, A21 to A23, A31 to A33 can be disposed in a matrix shape.

Each covered copper wire 17 is fastened by threads 11a to the base member 11 in the load sensor 1 so as to be movable relative to the surface of each electrically-conductive elastic body 12. Therefore, in a case where the electrically-conductive elastic body 12 has been elastically deformed due to stretch and contraction, etc., while the covered copper wire 17 is allowed to move relative to the electrically-conductive elastic body 12, the disposition of the covered copper wire 17 in the load sensor 1 can be maintained at a predetermined position.

Modification of Embodiment 1

In Embodiment 1 above, the connection part 13a of the covered copper wire 13 is connected to the electrically-conductive elastic body 12 by threads 14. However, the means for connecting the connection part 13a and the electrically-conductive elastic body 12 together is not limited thereto.

FIG. 7A to FIG. 7C each show a modification in which an eyelet 21 is used instead of the threads 14.

As shown in FIG. 7A, the eyelet 21 is a tubular member provided with a hole penetrating the eyelet 21 in the up-down direction. The eyelet 21 is formed from aluminum or copper, which is electrically conductive. At each of an upper end portion 21a and a lower end portion 21b, an opening continuous to the inner cavity thereof is formed. The height (the length in the Z-axis direction) of the eyelet 21 is slightly greater than the thickness obtained by adding the thickness of the electrically-conductive elastic body 12 and the thickness of the base member 11. When the eyelet 21 is used, a hole 12a penetrating the electrically-conductive elastic body 12 in the up-down direction and a hole 11c penetrating the base member 11 in the up-down direction (see FIG. 7C) are formed at the position at which the eyelet 21 is to be set. The diameter of the hole 12a, 11c is substantially the same as the outer diameter of the eyelet 21.

As shown in FIG. 7A, at the time of assembly, the connection part 13a is caused to have a shape extending along the outer periphery of the eyelet 21, and the eyelet 21 is inserted into the inside of the connection part 13a in a looped shape. Then, the eyelet 21 is passed through the hole 12a of the electrically-conductive elastic body 12 and the hole 11c of the base member 11. At this time, the eyelet 21 is positioned with respect to the electrically-conductive elastic body 12 and the base member 11 such that the upper end portion 21a slightly protrudes in the upward direction from the upper face of the electrically-conductive elastic body 12 and the lower end portion 21b slightly protrudes in the downward direction from the lower face of the base member 11.

In this state, the upper end portion 21a is crimped onto the upper face of the electrically-conductive elastic body 12, and the lower end portion 21b is crimped onto the lower face of the base member 11. At this time, the upper end portion 21a is bent in the downward direction while being outwardly widened as shown in FIG. 7B and FIG. 7C, and the lower end portion 21b is bent in the upward direction while being outwardly widened as shown in FIG. 7C. As a result, the eyelet 21 presses and fixes the connection part 13a to the surface of the electrically-conductive elastic body 12, as indicated by a white arrow, such that the connection part 13a is movable with respect to the surface of the electrically-conductive elastic body 12. Accordingly, similar to Embodiment 1, the connection part 13a is connected to the electrically-conductive elastic body 12.

Therefore, when the eyelet 21 is used as well, similar to Embodiment 1 above, the covered copper wire 13 is movable while being in contact with the electrically-conductive elastic body 12, in accordance with elastic deformation of the electrically-conductive elastic body 12. Therefore, even when the electrically-conductive elastic body 12 has been elastically deformed due to stretch and contraction, etc., the connection between the covered copper wire 13 and the electrically-conductive elastic body 12 is maintained. Therefore, reliability in the connection between the element part and the wiring can be enhanced. When the eyelet 21 is used, the covered copper wire 13 can be easily fixed to the electrically-conductive elastic body 12, compared with the case where threads 14 are sewn.

In Embodiment 1 above, the connection part 13a of the covered copper wire 13 is in a looped shape wound in a circular shape. However, the shape of the connection part 13a is not limited thereto, and may be a U-shape, a rectangular shape, a spiral shape, or the like.

Figure 8A:
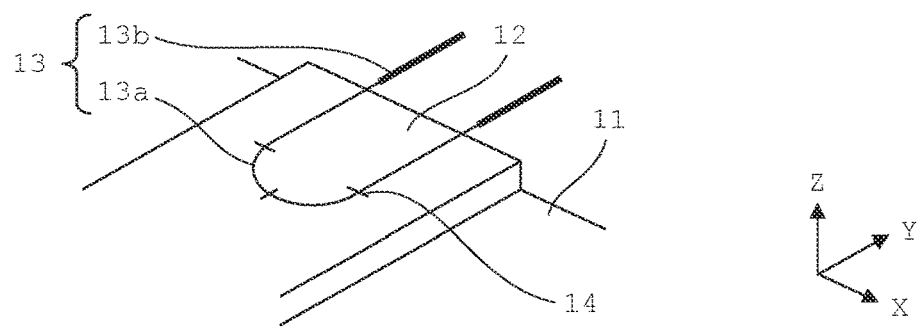
FIG. 8A is a perspective view schematically showing an end portion on the Y-axis positive side of an electrically-conductive elastic body, a connection part of a covered copper wire, and threads, according to a modification of Embodiment 1.

FIG. 8A shows a modification in which the shape of the connection part 13a is a U-shape. In this modification, the connection part 13a of the covered copper wire 13 is in a U-shape. In this case, three places on the X-axis positive side, the X-axis negative side, and the Y-axis negative side of the connection part 13a are fastened to the electrically-conductive elastic body 12 by three threads 14. In this case as well, reliability in the connection between the element part and the wiring can be enhanced. However, in the case of FIG. 8A, the contact area between the connection part 13a and the electrically-conductive elastic body 12 is reduced when compared with that of Embodiment 1 above. Therefore, from the viewpoints of increase of the contact area and reduction of the contact resistance, it is preferable that the connection part 13a is in a looped shape wound in a circular shape, as in Embodiment 1 above.

In Embodiment 1 above, the connection part 13a of the covered copper wire 13 is fixed only to the electrically-conductive elastic body 12 and the base member 11 which are positioned on the lower side. However, the connection part 13a may be fixed also to the base member 20 which is positioned on the upper side.

Figure 8B:
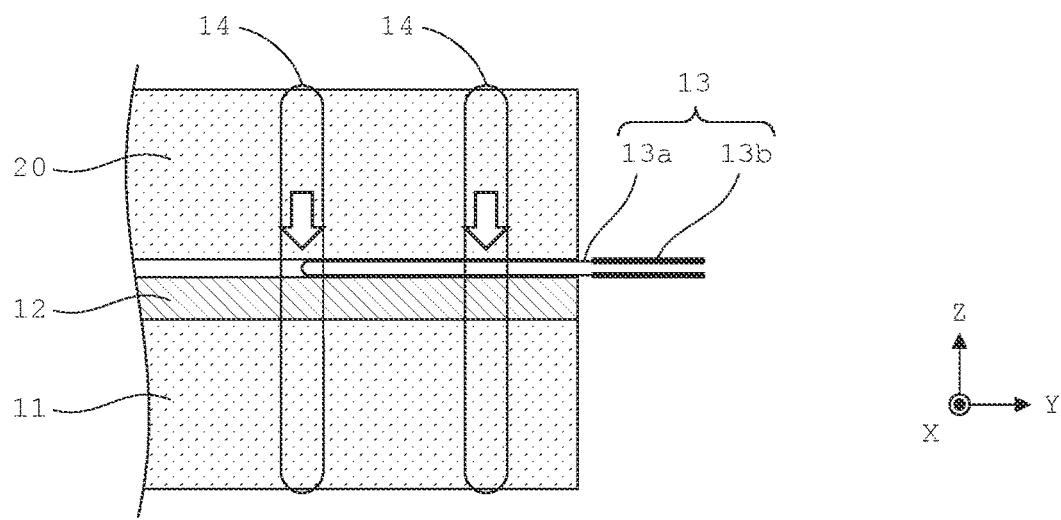
FIG. 8B and FIG. 8C are each a side view schematically showing a cut surface along a plane parallel to a Y-Z plane passing through the center of the connection part, according to the modification of Embodiment 1.

FIG. 8B shows a modification in which, when threads 14 are used, the threads 14 are fixed also to the base member 20 on the upper side.

As shown in FIG. 8B, each thread 14 of the present modification is fixed so as to penetrate, in the up-down direction, the base member 11, the electrically-conductive elastic body 12, and the base member 20, by passing through the inner side and the outer side of the connection part 13a. In this case, the base member 20 is disposed so as to be in close contact with the electrically-conductive elastic body 12, and the thread 14 brings the two base members 11, 20 into close contact with each other. Accordingly, as indicated by each white arrow, the thread 14 indirectly, via the base members 11, 20, presses and fixes the connection part 13a to the surface of the electrically-conductive elastic body 12 such that the connection part 13a is movable with respect to the surface of the electrically-conductive elastic body 12. As a result, the connection part 13a is connected to the electrically-conductive elastic body 12.

Figure 8C:
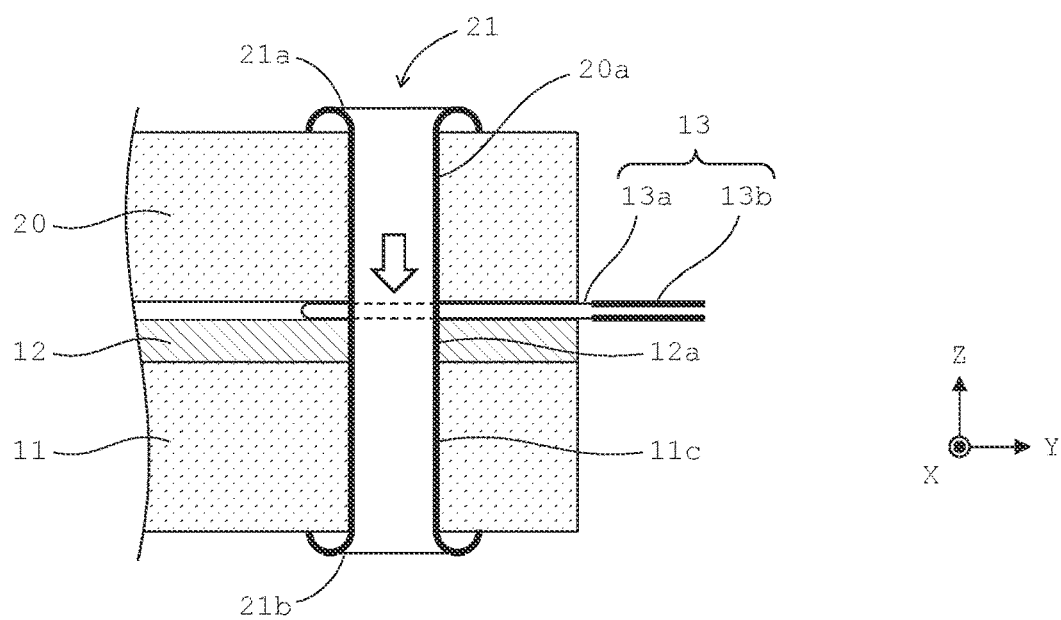

FIG. 8C shows a modification in which, when an eyelet 21 is used, the eyelet 21 is fixed also to the base member 20 on the upper side.

As shown in FIG. 8C, the height (the length in the Z-axis direction) of the eyelet 21 of the present modification is slightly greater than the thickness from the lower face of the base member 11 to the upper face of the base member 20. A hole 20a penetrating the base member 20 in the up-down direction, a hole 12a penetrating the electrically-conductive elastic body 12 in the up-down direction, and a hole 11c penetrating the base member 11 in the up-down direction are formed at the position at which the eyelet 21 is to be set. The diameter of the hole 20a, 12a, 11c is substantially the same as the outer diameter of the eyelet 21.

In this case as well, the eyelet 21 is positioned such that the upper end portion 21a slightly protrudes in the upward direction from the upper face of the base member 20 and the lower end portion 21b slightly protrudes in the downward direction from the lower face of the base member 11. In this state, the upper end portion 21a is crimped onto the upper face of the base member 20, and the lower end portion 21b is crimped onto the lower face of the base member 11.

Then, similar to FIG. 8B, as indicated by a white arrow, the eyelet 21 indirectly, via the base members 11, 20, presses and fixes the connection part 13a to the surface of the electrically-conductive elastic body 12 such that the connection part 13a is movable with respect to the surface of the electrically-conductive elastic body 12. That is, as a result of the eyelet 21 being crimped, the connection part 13a is sandwiched and fixed by the base members 11, 20 while receiving certain pressing forces in the up-down direction. As a result, the connection part 13a is connected to the electrically-conductive elastic body 12.

Embodiment 2

In Embodiment 1, the base member 20 is set on the upper face of the structure 1a shown in FIG. 3A. However, in Embodiment 2, another structure 30 that has three electrically-conductive elastic bodies 32 is set on the upper face of the structure 1a shown in FIG. 3A.

FIG. 9A is a perspective view schematically showing a configuration of the structure 30.

The structure 30 includes a base member 31, three electrically-conductive elastic bodies 32, three covered copper wires 33, and a plurality of threads 34 for fixing each covered copper wire 33 to a corresponding electrically-conductive elastic body 32. The base member 31 is formed from the same material as that of the base member 11, and the thickness of the base member 31 is similar to the thickness of the base member 11. Electrically-conductive elastic bodies 32 similar to the electrically-conductive elastic bodies 12 set on the base member 11 are set on the face on the Z-axis negative side of the base member 31. The three electrically-conductive elastic bodies 32 are disposed so as to be superposed on the three electrically-conductive elastic bodies 12, when the structure 30 is superposed on the structure 1a. Each covered copper wire 33 is connected to the vicinity of an end portion on the Y-axis positive side of a corresponding electrically-conductive elastic body 32. The covered copper wire 33 has a configuration similar to that of the covered copper wire 13, and the thread 34 has a configuration similar to that of the thread 14. A connection part 33a of the covered copper wire 33 is connected by four threads 34 to the electrically-conductive elastic body 32 in a manner similar to that by the threads 14. As a result, the structure 30 shown in FIG. 9A is assembled.

Subsequently, from above the structure 1a shown in FIG. 3A, the structure 30 in FIG. 9A is set in a state of being reversed in the up-down direction, as shown in FIG. 9B. Four corners of the base member 31 are connected to the base member 11 by a silicone rubber-based adhesive, a thread, or the like, whereby the structure 30 is fixed to the base member 11. At this time, covered portions 33b of the covered copper wires 33 are fixed in a state of being bundled by threads 15a, to the upper face of the wiring fixation base member 15, as in the case of the covered portions 13b of the covered copper wires 13. In this case, the covered portions 33b of the covered copper wires 33 and the covered portions 13b of the covered copper wires 13 may be bundled together. End portions on the side opposite to the connection part 33a of each covered copper wire 33 is connected to the circuit connection terminal 16. Then, as shown in FIG. 9B, a load sensor 1 of Embodiment 2 is completed.

Figure 10A:
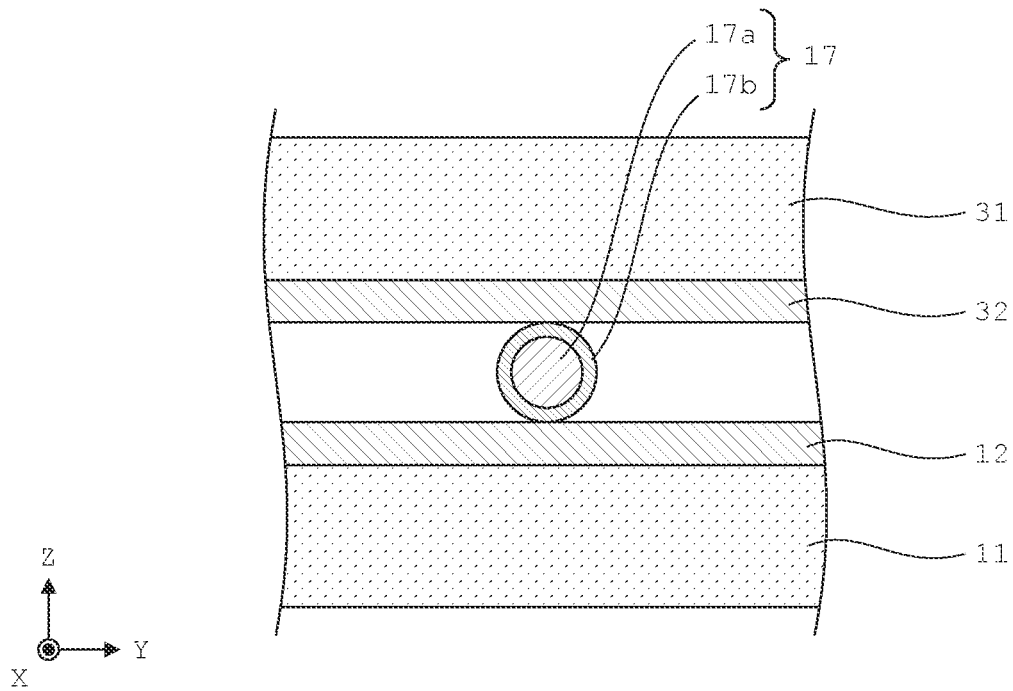
FIG. 10A and FIG. 10B are each a cross-sectional view schematically showing a covered copper wire disposed on the upper face of an electrically-conductive elastic body when viewed in the X-axis negative direction, according to Embodiment 2.
Figure 10B:
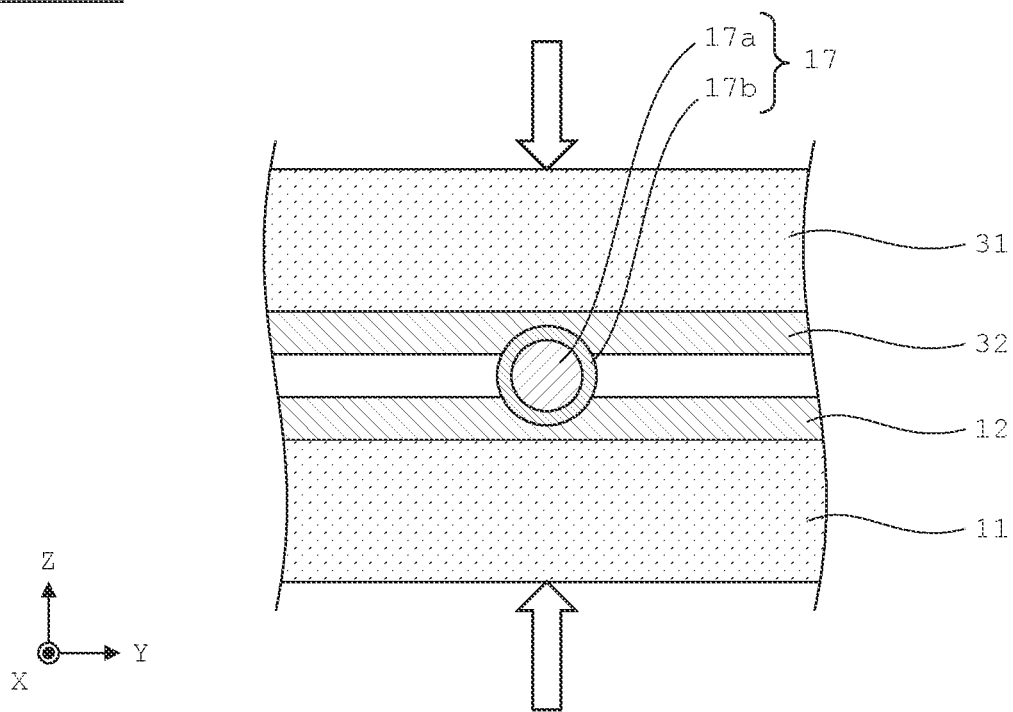

FIG. 10A and FIG. 10B are each a cross-sectional view schematically showing the periphery of a covered copper wire 17 when viewed in the X-axis negative direction. FIG. 10A shows a state where no load is applied, and FIG. 10B shows a state where loads are applied.

When no load is applied to the region shown in FIG. 10A, the force applied between the electrically-conductive elastic body 12 and the covered copper wire 17 and the force applied between the covered copper wire 17 and the electrically-conductive elastic body 32 are substantially zero. From this state, as shown in FIG. 10B, when a load is applied in the upward direction to the lower face of the base member 11, and a load is applied in the downward direction to the upper face of the base member 31, the two electrically-conductive elastic bodies 12, 32 having elasticity are deformed by the covered copper wire 17.

As shown in FIG. 10B, when the loads are applied, the covered copper wire 17 is brought close to the two electrically-conductive elastic bodies 12, 32 so as to be wrapped by the two electrically-conductive elastic bodies 12, 32, and the contact area between the covered copper wire 17 and the electrically-conductive elastic body 12 and the contact area between the covered copper wire 17 and the electrically-conductive elastic body 32 increase. Accordingly, the capacitance between the copper wire 17a in the covered copper wire 17 and the electrically-conductive elastic body 12 and the capacitance between the copper wire 17a in the covered copper wire 17 and the electrically-conductive elastic body 32 change. Then, the load applied to this region is calculated on the basis of the sum of the two capacitances.

Effects of Embodiment 2

According to Embodiment 2, the following effects are exhibited in addition to effects similar to those in Embodiment 1.

As shown in FIG. 9A and FIG. 9B, the structure 30 is disposed on the upper side of the structure 1a such that each electrically-conductive elastic body 32 is superposed on the covered copper wires 17. Then, on the basis of the sum of the capacitance between the copper wire 17a of the covered copper wire 17 and the electrically-conductive elastic body 12 and the capacitance between the copper wire 17a in the covered copper wire 17 and the electrically-conductive elastic body 32, the load is calculated. Accordingly, when compared with Embodiment 1, the capacitance is increased, and thus, sensitivity of the load sensor 1 can be enhanced. Therefore, load detection accuracy of the load sensor 1 can be enhanced. In addition, since the upper and lower sides of the covered copper wire 17 are shielded by the electrically-conductive elastic bodies 12, 32, respectively, noise occurring in the copper wire 17a of the covered copper wire 17 can be suppressed.

Modification of Embodiment 2

In Embodiment 2 above, separate covered copper wires 13, 33 are drawn from the electrically-conductive elastic body 12 on the structure 1a side and the electrically-conductive elastic body 32 on the structure 30 side, respectively. However, a common covered copper wire may be drawn from the two electrically-conductive elastic bodies 12, 32 superposed on each other in the up-down direction.

FIG. 11A shows a modification in which, in Embodiment 2 above, a common covered copper wire 13 is drawn from two electrically-conductive elastic bodies 12, 32 superposed on each other in the up-down direction, and the covered copper wire 13 is fixed by threads 14.

As shown in FIG. 11A, in this modification, in the vicinity of end portions on the Y-axis positive side of the electrically-conductive elastic bodies 12, 32, each thread 14 is sewn so as to penetrate the upper and lower members, as in the case of the modification described with reference to FIG. 8B. Accordingly, the connection part 13a of the covered copper wire 13 is sandwiched by the two electrically-conductive elastic bodies 12, 32, and is pressed and fixed to the surfaces of the two electrically-conductive elastic bodies 12, 32 so as to be movable with respect to the surfaces of the two electrically-conductive elastic bodies 12, 32.

As a result, the load sensor 1 of this modification is completed as shown in FIG. 11B. In this modification, when viewed from the upper face side of the base member 31, four threads 14 are provided at each of three positions corresponding to the electrically-conductive elastic bodies 12, 32 superposed on each other in the up-down direction, and each covered copper wire 13 is fixed by four threads 14.

Figure 12A:
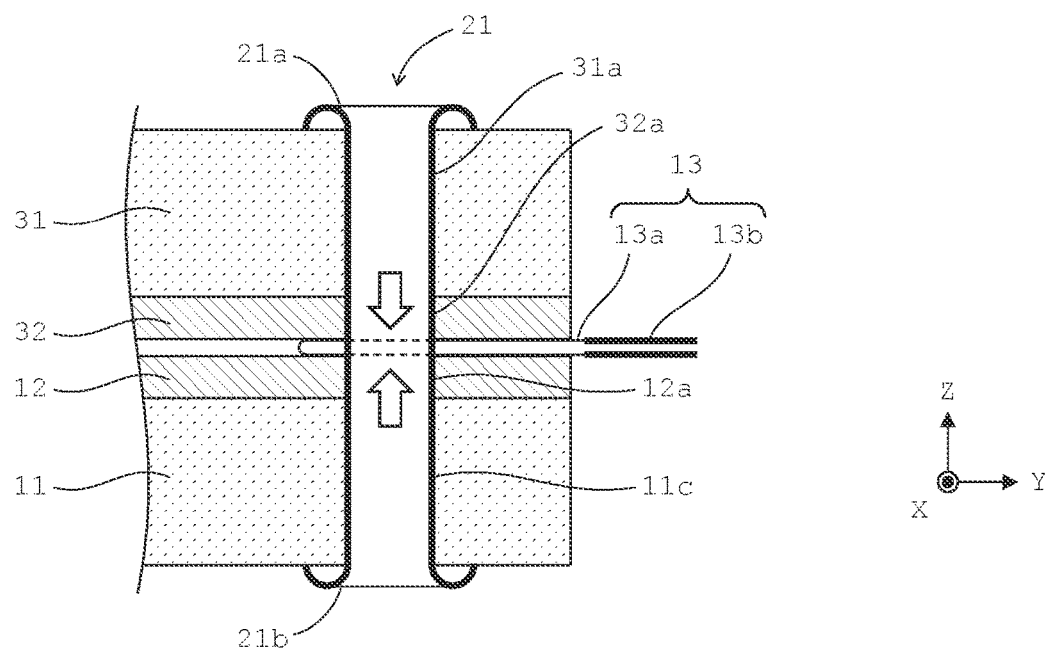
FIG. 12A is a side view schematically showing a cut surface along a plane parallel to a Y-Z plane passing through the center of a connection part, according to a modification of Embodiment 2.

FIG. 12A shows a modification in which, in Embodiment 2 above, a common covered copper wire 13 is drawn from two electrically-conductive elastic bodies 12, 32 superposed on each other in the up-down direction, and the covered copper wire 13 is fixed by an eyelet 21.

As shown in FIG. 12A, in this modification, similar to the modification described with reference to FIG. 8C, in the vicinity of end portions on the Y-axis positive side of the electrically-conductive elastic bodies 12, 32, an eyelet 21 is passed through a hole 31a of the base member 31, a hole 32a of the electrically-conductive elastic body 32, a hole 12a of the electrically-conductive elastic body 12, and a hole 11c of the base member 11, and is set so as to penetrate each member in the up-down direction. Accordingly, the connection part 13a of the covered copper wire 13 is sandwiched by the two electrically-conductive elastic bodies 12, 32, and is pressed and fixed to the surfaces of the two electrically-conductive elastic bodies 12, 32 so as to be movable with respect to the surfaces of the two electrically-conductive elastic bodies 12, 32.

Figure 12B:
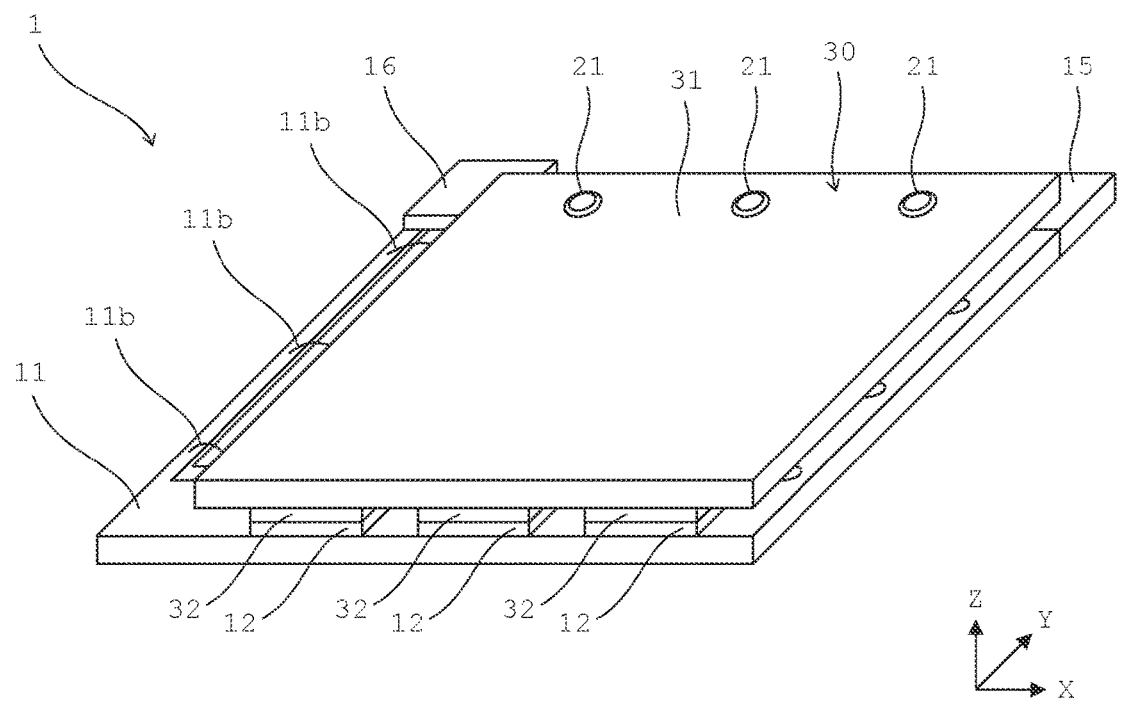
FIG. 12B is a perspective view schematically showing a load sensor of which assembling has been completed, according to the modification of Embodiment 2.

As a result, the load sensor 1 of this modification is completed as shown in FIG. 12B. In this modification, when viewed from the upper face side of the base member 31, an eyelet 21 is provided at each of three positions corresponding to the electrically-conductive elastic bodies 12, 32 superposed on each other in the up-down direction, and each covered copper wire 13 is fixed by one eyelet 21.

In Embodiment 2 above, the two covered copper wires 13, 33 respectively connected to the electrically-conductive elastic body 12 and the electrically-conductive elastic body 32 are each fixed by threads, but may be each fixed by an eyelet. Alternatively, one of the two covered copper wires 13, 33 may be fixed by threads, and the other may be fixed by an eyelet.

Embodiment 3

In Embodiments 1, 2, as shown in FIG. 3A, the end portions on the X-axis negative side of each covered copper wire 17 set on the electrically-conductive elastic bodies 12 are directly fixed to the base member 11 by threads 11b. However, in Embodiment 3, a shield layer 41 is set between the covered copper wire 17 and the base member 11.

FIG. 13A is a perspective view schematically showing the shield layer 41, a covered copper wire 42, and threads 43, which are set to the structure in FIG. 1B. When compared with FIG. 1B, the base member 11 in FIG. 13A is configured to be long in the X-axis direction.

The shield layer 41 is formed from a material similar to that of the electrically-conductive elastic body 12, and the thickness of the shield layer 41 is similar to the thickness of the electrically-conductive elastic body 12. The shield layer is configured to have a size, in the X-Y plane, that can substantially include the covered copper wires 17 positioned to the left of the left-end electrically-conductive elastic body 12. The shield layer 41 is set on the upper face of the base member 11 with an adhesive or the like. The covered copper wire 42 is set, by the threads 43, in the vicinity of an end portion on the Y-axis positive side of the shield layer 41. The covered copper wire 42 has a configuration similar to that of the covered copper wire 13, and the thread 43 has a configuration similar to that of the thread 14. A connection part 42a of the covered copper wire 42 is connected to the shield layer 41 by the threads 43, similar to the connection part 13a of the covered copper wire 13. End portions on the side opposite to the connection part 42a of the covered copper wire 42 are connected to the circuit connection terminal 16.

Then, similar to Embodiment 1, three covered copper wires 17 and threads 11a, 11b are set to the structure in FIG. 13A. In the vicinity of an end portion on the X-axis negative side of the base member 11, the covered copper wires 17 extending in the Y-axis direction are connected, in a state of being bundled by threads 11b, to the upper face of the shield layer 41. As a result, the structure 1a of Embodiment 3 is assembled as shown in FIG. 13B.

Figure 14A:
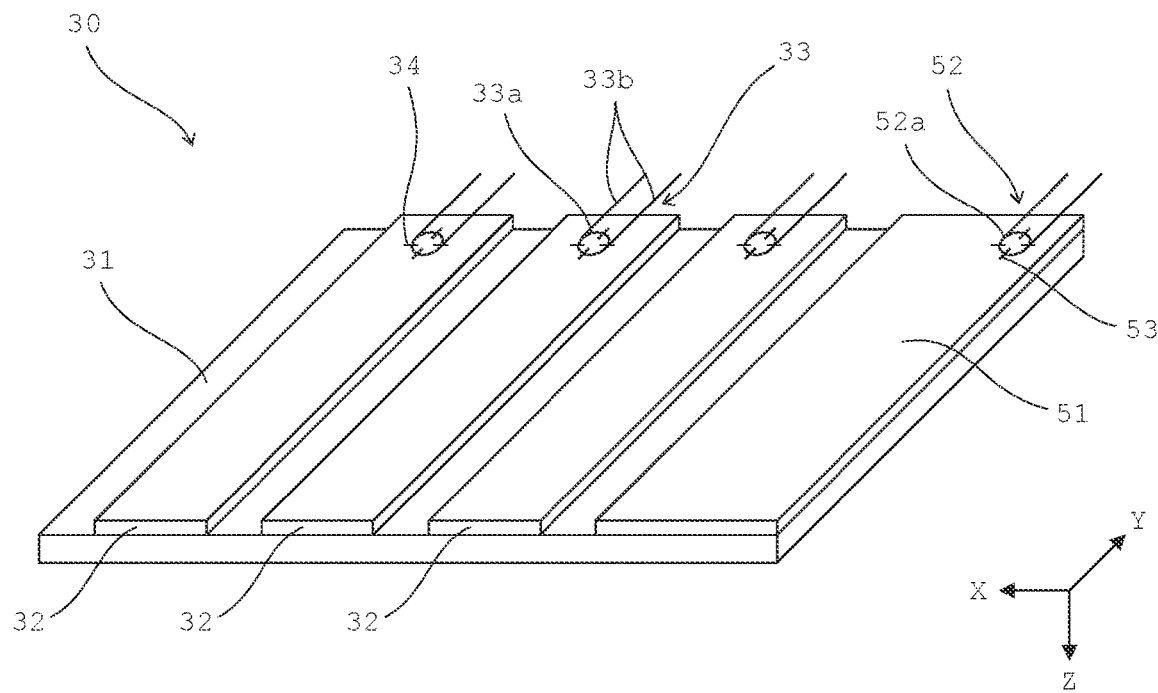
FIG. 14A is a perspective view schematically showing a configuration of a structure on the upper side according to Embodiment 3.

FIG. 14A is a perspective view schematically showing a shield layer 51, a covered copper wire 52, and threads 53 set to the structure in FIG. 9A. When compared with FIG. 9A, the base member 31 in FIG. 14A is configured to be long in the X-axis direction.

The shield layer 51 is formed from a material similar to that of the electrically-conductive elastic body 32, and the thickness of the shield layer 51 is similar to the thickness of the electrically-conductive elastic body 32. The shield layer 51 is configured to have a size, in the X-Y plane, similar to that of the shield layer 41 in FIG. 13A. The shield layer 51 is set on the face on the Z-axis negative side of the base member 31 with an adhesive or the like. The covered copper wire 52 is set, by the threads 53, in the vicinity of an end portion on the Y-axis positive side of the shield layer 51. The covered copper wire 52 has a configuration similar to that of the covered copper wire 33, and the thread 53 has a configuration similar to that of the thread 34. A connection part 52a of the covered copper wire 52 is connected to the shield layer 51 by the threads 53, similar to the connection part 33a of the covered copper wire 33. As a result, the structure 30 of Embodiment 3 is assembled as shown in FIG. 14A.

Figure 14B:
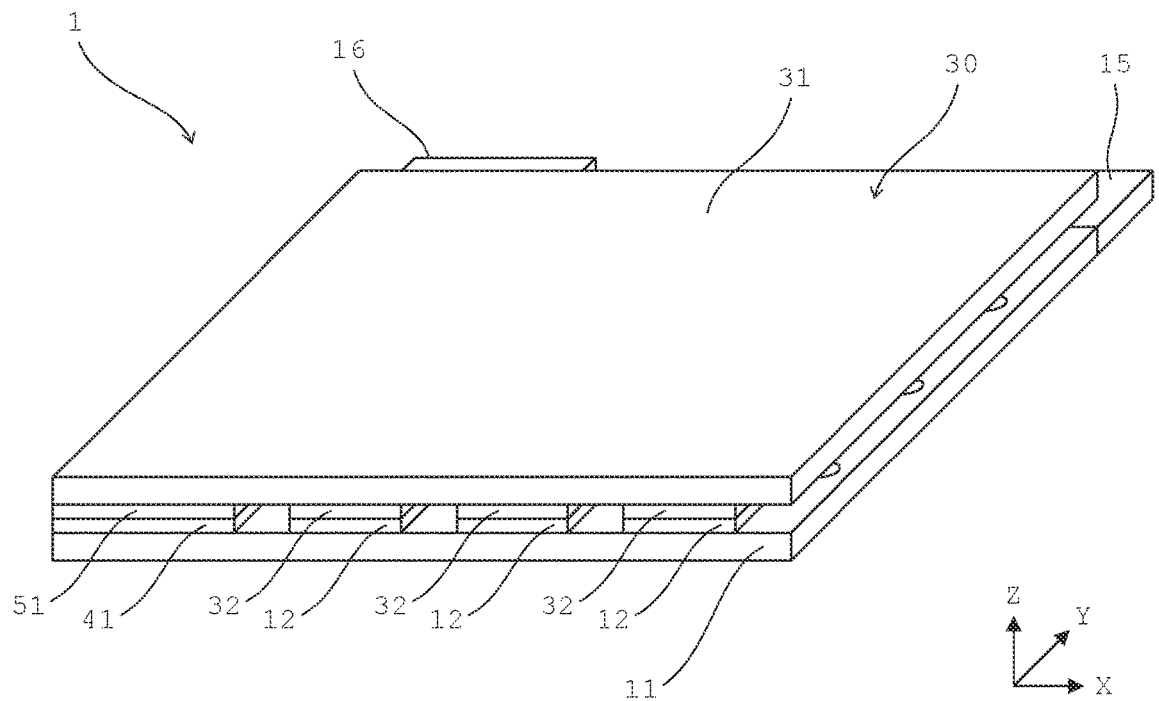
FIG. 14B is a perspective view schematically showing a load sensor of which assembling has been completed, according to Embodiment 3.

Subsequently, as shown in FIG. 14B, from above the structure 1a in FIG. 13B, the structure 30 in FIG. 14A is set in a state of being reversed in the up-down direction. Four corners of the base member 31 are connected to the base member 11 by a silicone rubber-based adhesive, a thread, or the like, whereby the structure 30 is fixed to the base member 11. At this time, end portions on the side opposite to the connection part 52a of the covered copper wire 52 are connected to the circuit connection terminal 16. Then, as shown in FIG. 14B, a load sensor 1 of Embodiment 3 is completed.

When the load sensor 1 is used, an electric potential having the same polarity as that of the electrically-conductive elastic body 12 is applied to the shield layer 41, and an electric potential having the same polarity as that of the electrically-conductive elastic body 32 is applied to the shield layer 51. Accordingly, occurrence of noise in the covered copper wires 17 in the ranges of the shield layers 41, 51 is suppressed.

Effects of Embodiment 3

According to Embodiment 3, the following effects are exhibited in addition to effects similar to those in Embodiments 1, 2.

The shield layers 41, 51 shield each covered copper wire 17 drawn from an element part, from external noise. Accordingly, noise superposed on the covered copper wire 17 can be reduced. The shield layer 41 is disposed on the same face as that of the base member 11 on which the electrically-conductive elastic bodies 12 are disposed, and the shield layer 51 is disposed on the same face as that of the base member 31 on which the electrically-conductive elastic bodies 32 are disposed. Therefore, setting of the shield layers 41, 51 is facilitated.

Other Modifications

Various modifications of the configuration of the load sensor 1 can be made in addition to the configurations shown in Embodiments 1 to 3 above.

For example, in Embodiments 1 to 3 above, three electrically-conductive elastic bodies 12 are set on the surface of the base member 11. However, the number of electrically-conductive elastic bodies 12 disposed on the load sensor 1 is not limited thereto. For example, on the entire surface of the base member 11, one electrically-conductive elastic body 12 may be disposed, or four or more electrically-conductive elastic bodies 12 may be disposed. In addition, although three covered copper wires 17 are disposed with respect to three electrically-conductive elastic bodies 12, the numbers of electrically-conductive elastic bodies 12 and covered copper wires 17 that are disposed are not limited thereto. For example, a plurality of covered copper wires 17 extending in the X-axis direction may be disposed so as to be arranged in the Y-axis direction, with respect to one electrically-conductive elastic body 12 extending in the Y-axis direction. Alternatively, the load sensor 1 may be provided with one electrically-conductive elastic body 12 and one covered copper wire 17 only.

In association with changes in the number of electrically-conductive elastic bodies 12 and the number of covered copper wires 17, the number of element parts in each of which capacitance changes in accordance with a load is also changed. That is, the number of element parts provided in the load sensor 1 is not limited to the number shown in Embodiments 1 to 3 above, and another number of element parts may be provided in the load sensor 1.

In Embodiments 1 to 3 above, a plurality of covered copper wires 13 are bundled by the threads 15a such that the cross-section of the concentrated space thereof has a planar shape. However, not limited thereto, the plurality of covered copper wires 13 may be bundled by the threads 15a such that the cross-section of the concentrated space has another shape (e.g., a quadrangular shape or a triangular shape). Similarly, the plurality of covered copper wires 17 may also be bundled by the threads 11b such that the cross-section of the concentrated space thereof has another shape. In addition, the plurality of covered copper wires 33 may be bundled by the threads 15a such that, not limited to a planar shape, the cross-section of the concentrated space thereof has another shape.

In Embodiment 1 above, as shown in FIG. 2C, the thread 14 sews the covered copper wire 13 to the electrically-conductive elastic body 12 and the base member 11. However, not limited thereto, the thread 14 may sew the covered copper wire 13 only to the electrically-conductive elastic body 12. In Embodiment 2 above, the thread 34 sews the covered copper wire 33 to the electrically-conductive elastic body 32 and the base member 31, but not limited thereto, the thread 34 may sew the covered copper wire 33 only to the electrically-conductive elastic body 32. Similarly, the thread 43 may also sew the covered copper wire 42 only to the shield layer 41, and the thread 53 may also sew the covered copper wire 52 only to the shield layer 51.

In Embodiments 1 to 3 and the modifications above, the threads 14, 34, 43, 53 and the eyelet 21 are formed from a material that has electrical conductivity, but need not necessarily have electrical conductivity. However, from the viewpoint of reduction of contact resistance, it is preferable that the threads 14, 34, 43, 53 and the eyelet 21 are configured to have electrical conductivity, as described above.

In Embodiment 3 above, the shield layer is disposed on the upper and lower sides of the covered copper wires 17, but may be disposed only on the upper side or the lower side of the covered copper wires 17. The shield layer may also be provided so as to cover the entirety of the outer side of the load sensor 1.

In Embodiment 1 above, the base member 20 may be an insulative member having elasticity. In this case, the base member 20 is formed from a material similar to that of the base member 11, for example.

In Embodiments 1 to 3 above, the covered copper wires 13, 17, 33, 42, 52 are directly connected to the circuit connection terminal 16. However, not limited thereto, the covered copper wires 13, 17, 33, 42, 52 may be connected to another terminal connected to the circuit connection terminal 16, thereby being connected indirectly, via the other terminal, to the circuit connection terminal 16.

In Embodiments 1 to 3 above, the covering member of the connection part 13a of each covered copper wire 13 is removed by soldering, but not limited thereto, may be removed by another means. For example, the covering member of the connection part 13a may be removed by a chemical processing technique such as immersing the connection part 13a into an ammonia-based reagent, potassium hydroxide, or the like. Similarly, the covering member of the connection part of the covered copper wires 33, 42, 52 may be removed by another means, not limited to soldering.

In Embodiments 1 to 3 above, instead of each covered copper wire 17, a covered copper wire 60 implemented as a stranded wire obtained by bundling a plurality of covered copper wires 17 may be used.

FIG. 15A is an enlarged diagram schematically showing a configuration of the covered copper wire 60. FIG. 15B is a cross-sectional view schematically showing a configuration of the covered copper wire 60.

As shown in FIG. 15A, the covered copper wire 60 is a stranded wire obtained by stranding the covered copper wires 17 used in Embodiments 1 to 3 above. As shown in FIG. 15B, a plurality of covered copper wires 17 forming the covered copper wire 60 are gathered in a substantially circular shape, thereby forming a bundle. The diameter of the covered copper wire 60 is 0.3 mm, for example.

As shown in FIG. 15A and FIG. 15B, since the covered copper wire 60 is implemented as a stranded wire, the diameter of one covered copper wire 60 is greater than the diameter of one covered copper wire 17. Accordingly, the contact area between the covered copper wire 60 and the electrically-conductive elastic body 12, and the contact area between the covered copper wire 60 and the electrically-conductive elastic body 32 increase when compared with those in Embodiments 1 to 3. Therefore, the capacitance between the covered copper wire 60 and the electrically-conductive elastic body 12 and the capacitance between the covered copper wire 60 and the electrically-conductive elastic body 32 are increased, and thus, the sensitivity of the load sensor 1 can be enhanced. In addition, since the covered copper wire 60 is implemented as a stranded wire, flexibility can be enhanced and strength against bending can be enhanced, when compared with those in Embodiments 1 to 3.

Instead of each of the covered copper wires 13, 33, 42, 52, a covered copper wire implemented as a stranded wire obtained by bundling a plurality of covered copper wires may be used. In this case as well, in the covered copper wire implemented as a stranded wire, flexibility can be enhanced and strength against bending can be enhanced.

In Embodiments 1 to 3 above, the three covered copper wires 13 and the three covered copper wires 17 may be connected to an electronic circuit 18 outside the load sensor 1, through the following configuration, for example.

Figure 16A:
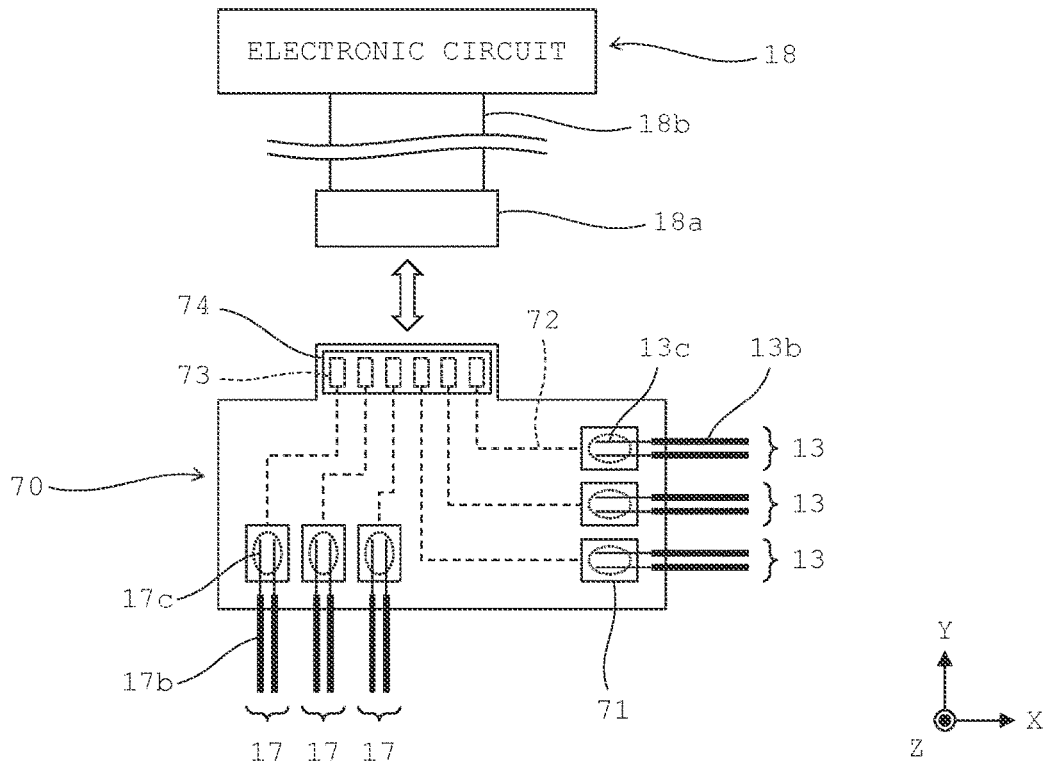
FIG. 16A is a plan view schematically showing a configuration of a connection substrate according to another modification.

FIG. 16A is a plan view schematically showing a configuration of a connection substrate 70 according to a modification in this case.

The connection substrate 70 includes six metal island parts 71, six patterns 72, six electrodes 73, and a connector 74.

The metal island parts 71 are provided on the connection substrate 70. Three covered copper wires 13 and three covered copper wires 17 are respectively connected to the metal island parts 71 by soldering. The covering member of a connection part 13c of each covered copper wire 13 and the covering member of a connection part 17c of each covered copper wire 17 are each removed in advance, before being connected to a corresponding metal island part 71. The covering member is removed by the connection part 13c, 17c being immersed in a bath containing a high temperature molten solder, as in the case of the connection part 13a above.

Each metal island part 71 is connected to a corresponding electrode 73 via a pattern 72. The patterns 72 and the electrodes 73 are provided on the connection substrate 70. The connector 74 is provided on the connection substrate 70 so as to cover the electrodes 73. Six terminals of the connector 74 are electrically connected the six electrodes 73, respectively. The connector 74 is a circuit connection terminal for connecting each element part of the load sensor 1 to the external electronic circuit 18.

The electronic circuit 18 is set on a main substrate (not shown). A connector 18a and cables 18b are connected to this main substrate. The connector 18a includes six terminals to be respectively connected to the six terminals on the connector 74 side. Each terminal of the connector 18a is connected to the electronic circuit 18 via a cable 18b. The connector 18a is set to an end portion of each cable 18b. As a result of the connector 18a being connected to the connector 74 of the connection substrate 70, the three electrically-conductive elastic bodies and the three covered copper wires 17 are electrically connected to the electronic circuit 18.

When the connection substrate 70 is configured in this manner, the connection substrate 70 and the electronic circuit can be smoothly connected to each other. In addition, terminal portions (the electrodes 73 and the connector 74) for connecting the covered copper wires 13 and the covered copper wires 17 to an external device can be configured to be compact.

Instead of the connection substrate 70 shown in FIG. 16A, another connector such as a box connector or a crimp connector may be used to connect the covered copper wires 13, 17 to the electronic circuit 18.

Figure 16B:
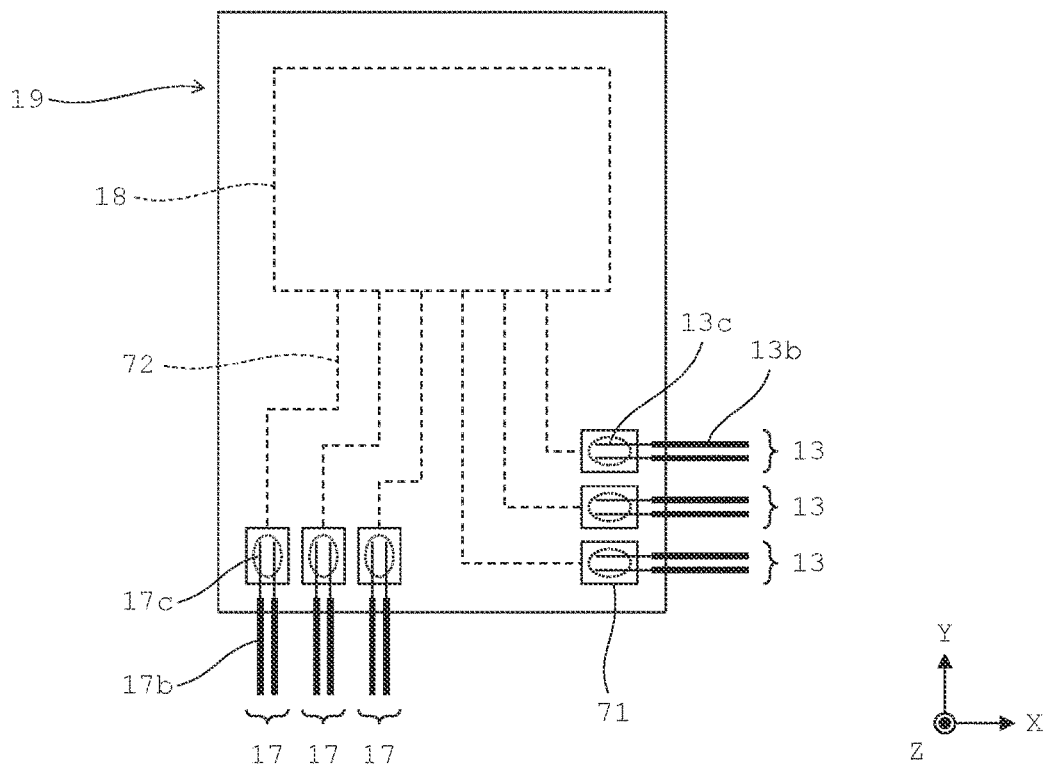
FIG. 16B is a plan view schematically showing a configuration of a main substrate according to another modification.

Alternatively, as shown in FIG. 16B, a main substrate 19 to which the electronic circuit 18 is mounted may be provided with six metal island parts 71, and the covered copper wires 13 and the covered copper wires 17 may be directly connected to these metal island parts 71 by soldering.

In Embodiments 1 to 3 above, the thread 11a, 11b, 14, 15a, 34, 43, 53 is sewn to a target object by embroidering, but not limited thereto, may be sewn to the target object by machine sewing. When the thread is sewn to the target object by machine sewing, the seam of the thread becomes strong.

Figure 17A:
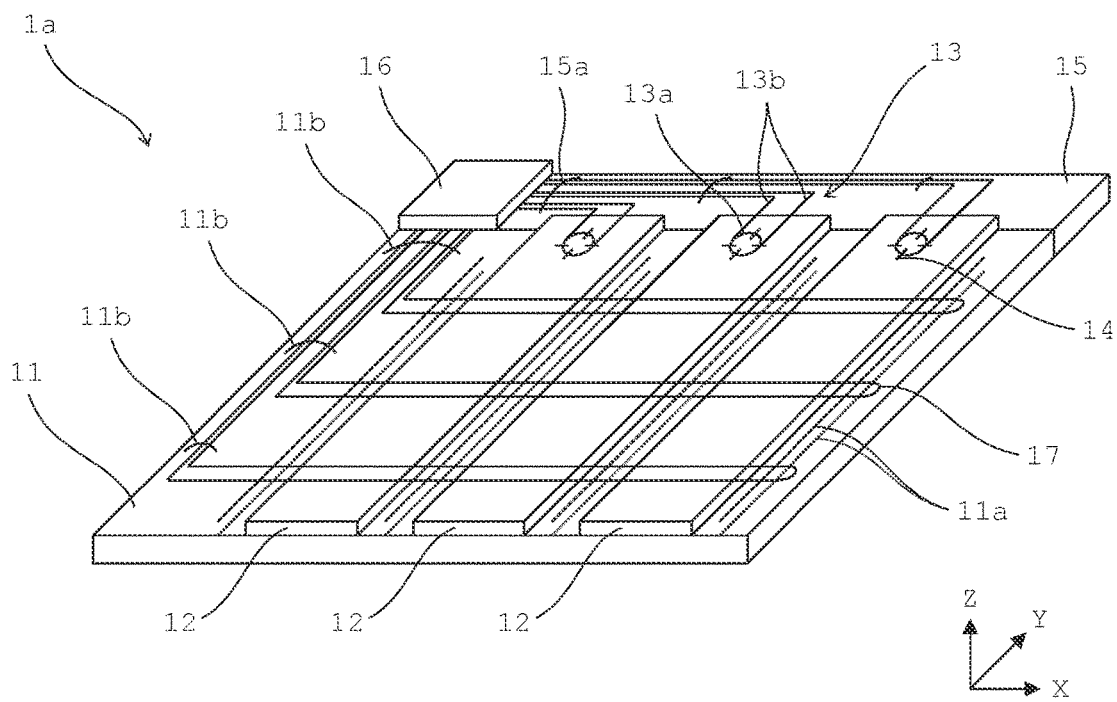
FIG. 17A is a perspective view schematically showing a state where covered copper wires are fixed to a base member by a thread when the thread is sewn by machine sewing, according to another modification.

FIG. 17A is a perspective view schematically showing a state where the covered copper wires 17 are fixed to the base member 11 by the thread 11a when the thread 11a is sewn by machine sewing. In this case, for example, the thread 11a is sewn in the Y-axis direction by machine sewing so as to extend across all of the three covered copper wires 17 arranged in the Y-axis direction.

Figure 17B:
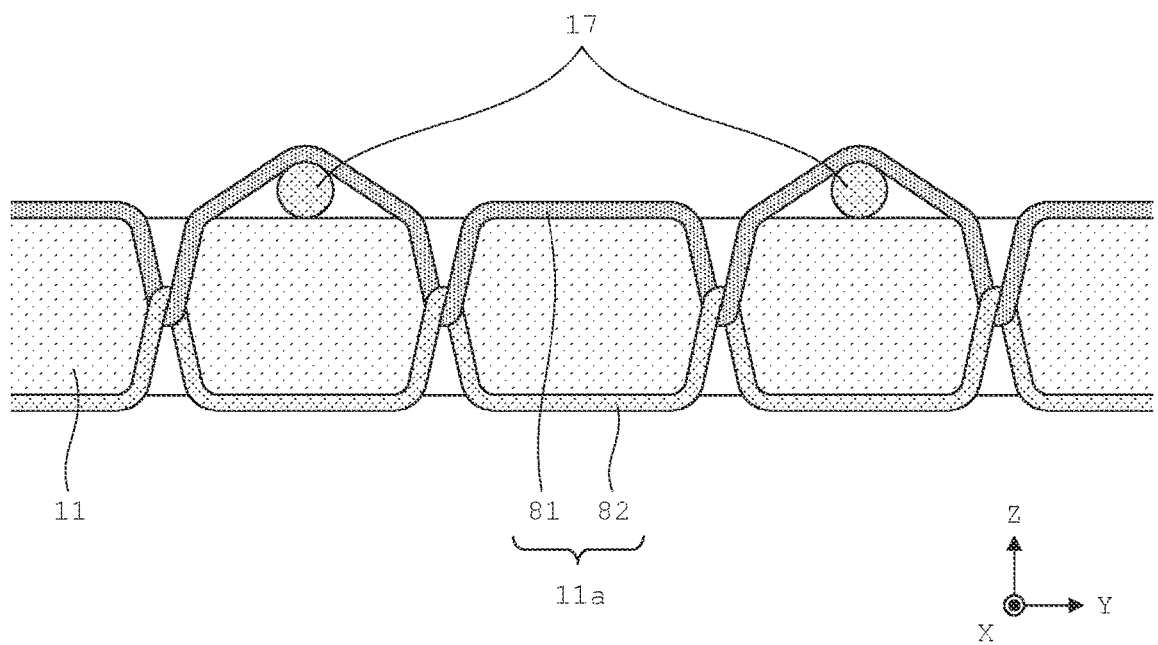
FIG. 17B is a side view schematically showing a cross-section obtained when a structure is cut along a plane parallel to a Y-Z plane at the position of the thread extending in a Y-axis direction, according to another modification.

FIG. 17B is a side view schematically showing a cross-section obtained when the structure 1a is cut along a plane parallel to the Y-Z plane at the position of the thread 11a extending in the Y-axis direction in FIG. 17A. When the thread 11a is sewn to the base member 11 by machine sewing, a needle thread 81 and a bobbin thread 82 of the thread 11a are connected to each other in the vicinity of the center in the up-down direction of the base member 11. When the needle thread 81 and the bobbin thread 82 are sewn to the base member 11 by machine sewing from the upper and lower sides, each covered copper wire 17 disposed on the upper face side of the base member 11 is pressed and fixed to the base member 11 by the needle thread 81 of the thread 11a.

Figure 18A:
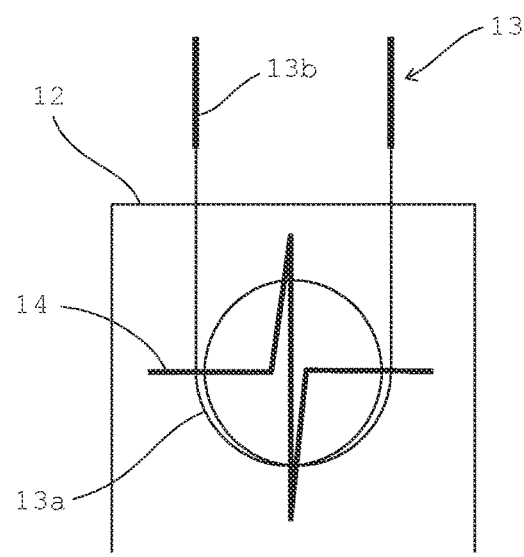
FIG. 18A and FIG. 18B are each a plan view schematically showing a state where a connection part of a covered copper wire is fixed to an electrically-conductive elastic body and a base member by a thread when the thread is sewn by machine sewing, according to another modification.
Figure 18B:
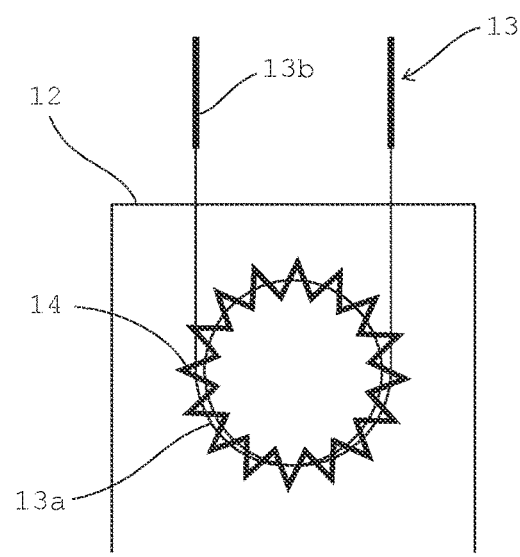
Figure 18B:
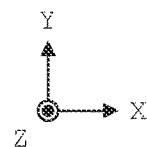
Figure 18B:
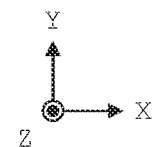
Figure 18C:
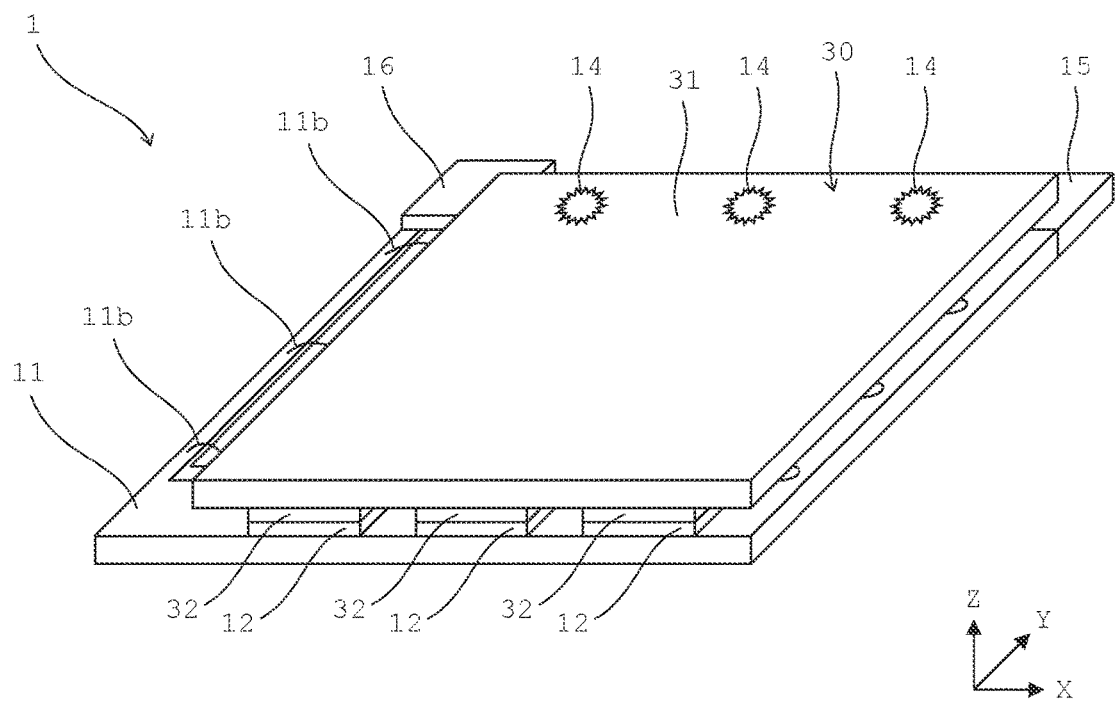
FIG. 18C is a perspective view schematically showing a configuration of a load sensor when a seam is provided over the entire periphery, according to another modification.

FIG. 18A and FIG. 18B are each a plan view schematically showing a state where the connection part 13a of the covered copper wire 13 is fixed to the electrically-conductive elastic body 12 and the base member 11 by the thread 14 when the thread is sewn by machine sewing. FIG. 18A shows a case where, similar to the case of FIG. 2B, four places of the connection part 13a are fixed by the thread 14. FIG. 18B shows a case where the shape of the seam has 16 vertexes. FIG. 18C is a perspective view schematically showing a configuration of the load sensor 1 when the seam is provided over the entire periphery as in FIG. 18B.

As shown in FIG. 18A and FIG. 18B, in the case of machine sewing, the thread 14 is sewn in a single sewing operation from the sewing start position to the sewing end position. Therefore, the seam seems to be continuous when viewed from the upper face side. In the case of FIG. 18A, the number of times the seam extends across the connection part 13*a* is 6. In the case of FIG. 18B, the number of times the seam extends across the connection part 13*a* is 32. As in the case of FIG. 18B, when the entire periphery of the connection part 13*a* is sewn by the thread 14 and the number of times the thread 14 extends across the connection part 13*a* is increased, the connection part 13*a* is more assuredly connected to the electrically-conductive elastic body 12.

It should be noted that, when the thread 14 is sewn over the entire periphery as shown in FIG. 18B and FIG. 18C, the thread 14 need not necessarily be sewn by machine sewing, but may be sewn by embroidery.

In addition to the above, various modifications can be made as appropriate to the embodiments of the present invention without departing from the scope of the technical idea defined by the claims.

What is claimed is:

1. A load sensor comprising:
   an element part in which capacitance changes in accordance with a load, wherein the element part includes an electrically-conductive elastic body that is electrically conductive and that forms one pole for the capacitance;
   a copper wire having a first end shaped into a loop that is electrically in contact with a surface of the electrically-conductive elastic body, and a second end adapted to be connected to a circuit for detecting capacitance; and
   a fixation tool configured to press and fix the copper wire to the surface of the electrically-conductive elastic body, while the copper wire is allowed to be movable on the surface of the electrically-conductive elastic body in response to elastic deformation of the electrically-conductive elastic body.

2. The load sensor according to claim 1, wherein
   the fixation tool presses and fixes the copper wire to the surface of the electrically-conductive elastic body such that not less than 30% of a surface area of the copper wire is in contact with the electrically-conductive elastic body.

3. The load sensor according to claim 1, wherein
   the fixation tool is a thread, and
   the copper wire is sewn to the electrically-conductive elastic body by the thread in a state where the copper wire is placed on the surface of the electrically-conductive elastic body.

4. The load sensor according to claim 1, wherein
   the fixation tool has electrical conductivity.

5. The load sensor according to claim 1, wherein
   the copper wire is a covered copper wire that is covered by a covering member that is insulative, and the covering member has been removed in a connection portion at which the copper wire is connected to the electrically-conductive elastic body.

6. The load sensor according to claim 5, wherein
   the covering member has been removed as a result of the connection portion having been subjected to soldering.

7. The load sensor according to claim 5, further comprising:
   another one or more element parts in addition to the element part; and
   another one or more copper wires in addition to the copper wire,
   wherein the copper wires extend from the element parts and are grouped into a bundle.

8. A load sensor comprising:
   an element part in which capacitance changes in accordance with a load;
   a copper wire drawn from the element part in order to detect change in the capacitance; and
   a fixation tool configured to fix the copper wire to the element part, wherein
   the element part includes an electrically-conductive elastic body that is electrically conductive and that forms one pole for the capacitance,
   the fixation tool presses and fixes the copper wire to a surface of the electrically-conductive elastic body so as to be movable with respect to the surface of the electrically-conductive elastic body in accordance with elastic deformation of the electrically-conductive elastic body,
   the fixation tool is an eyelet,
   the electrically-conductive elastic body has a hole configured to allow the eyelet to pass therethrough, and
   with the copper wire caused to extend along an outer periphery of the eyelet, the eyelet is passed through the hole and the eyelet is crimped, whereby the copper wire is connected to the electrically-conductive elastic body.

9. A load sensor comprising:
   an element part in which capacitance changes in accordance with a load, wherein the element part includes an electrically-conductive elastic body that is electrically conductive and that forms one pole for the capacitance;
   a circuit connection terminal configured to connect the element part to an external electronic circuit;
   a first copper wire having a first end shaped into a loop that is electrically in contact with a surface of the electrically-conductive elastic body, and a second end connected to the circuit connection terminal; and
   a second copper wire extending across the electrically-conductive elastic body while remaining in contact with the surface of the electrically-conductive elastic body, wherein the second copper wire being is covered by a dielectric body and forms another pole for the capacitance, and one end of the second copper wire is connected to the circuit connection terminal in order to detect change in the capacitance.

10. The load sensor according to claim 9, further comprising:
    another one or more element parts in addition to the element part; and
    another one or more second copper wires in addition to the second copper wire,
    wherein the second copper wires extend from the element part and are grouped into a bundle.

11. The load sensor according to claim 9, further comprising:
    another one or more element parts including electrically-conductive elastic bodies in addition to the element part including the electrically-conductive elastic body; and
    another one or more second copper wires in addition to the second copper wire, wherein
    the electrically-conductive elastic bodies are long in a first direction are disposed so as to be arranged in a second direction perpendicular to the first direction,
    the second copper wires each extend across the plurality of the electrically-conductive elastic bodies are disposed so as to be arranged in the first direction, and the second copper wires are bundled and connected to the circuit connection terminal.

12. The load sensor according to claim 9, wherein the second copper wire is fastened in the load sensor by a fastening tool so as to be movable relative to a surface of the electrically-conductive elastic body.

13. The load sensor according to claim 9,
wherein the second copper wire extends from the element part so that the one end of the second copper wire is connected to the circuit connection terminal, and
wherein the load sensor further comprises a shield layer configured to shield the second copper wire extending from the element part, from external noise.

14. The load sensor according to claim 13, comprising
a base member on which the electrically-conductive elastic body is disposed, and
the shield layer is disposed on a face that is a same as that, of the base member, on which the electrically-conductive elastic body is disposed.

* * * * *